United States Patent [19]
Dickerman et al.

[11] Patent Number: 6,160,874
[45] Date of Patent: Dec. 12, 2000

[54] VALIDATION GATEWAY

[75] Inventors: Robert Frank Dickerman, Cedar Rapids; George M. Kult, Fairfield, both of Iowa

[73] Assignee: MCI Communications Corporation, Washington, D.C.

[21] Appl. No.: 08/956,220

[22] Filed: Oct. 21, 1997

[51] Int. Cl.[7] .............................. H04M 17/00; H04M 3/00
[52] U.S. Cl. ....................... 379/114; 379/91.01; 379/265
[58] Field of Search ..................................... 379/112, 113, 379/144, 115, 91.01, 114, 265, 266, 309; 455/405

[56] References Cited

U.S. PATENT DOCUMENTS

| | | |
|---|---|---|
| 4,232,199 | 11/1980 | Boatwright et al. . |
| 4,577,061 | 3/1986 | Katzeff et al. . |
| 4,611,096 | 9/1986 | Asmuth et al. . |
| 4,625,081 | 11/1986 | Lotito et al. . |
| 4,685,127 | 8/1987 | Miller et al. . |
| 4,706,275 | 11/1987 | Kamil et al. . |
| 4,782,519 | 11/1988 | Patel et al. . |
| 4,791,640 | 12/1988 | Sand et al. . |
| 4,893,330 | 1/1990 | Franco . |
| 5,068,891 | 11/1991 | Marshall . |
| 5,195,086 | 3/1993 | Baumgartner et al. ................... 370/62 |
| 5,222,120 | 6/1993 | McLeod et al. . |
| 5,223,699 | 6/1993 | Flynn et al. ............................. 235/380 |
| 5,452,350 | 9/1995 | Reynolds et al. . |
| 5,483,582 | 1/1996 | Pugh et al. .............................. 379/144 |
| 5,590,181 | 12/1996 | Hogan et al. . |
| 5,636,371 | 6/1997 | Yu .......................................... 395/500 |
| 5,640,446 | 6/1997 | Everett et al. ........................... 379/111 |
| 5,774,695 | 6/1998 | Autrey et al. ........................... 395/500 |
| 5,825,857 | 10/1998 | Reto et al. ............................... 379/114 |
| 5,953,406 | 10/1998 | Larue et al. ............................. 379/201 |

FOREIGN PATENT DOCUMENTS

WO/91/16779  10/1991  WIPO .

OTHER PUBLICATIONS

"Centrex Call Center Tailoring for your Business", electronic brochure, www.nortel.com/pen/solutions/tailoring.html.

"Centrex CTI", electronic brochure, www.nortel.com/pen/solutions/cti.html.

"Centrex Call Center Reporting Options," electronic brochure, www.nortel.com/pen/solutions/reporting.html.

"Excel Switching", electronic brochure, www.xl.com/prod.htm.

"VCO Open Programmable Switches," electronic brochure, www.summa4.com/products/wpswitch.htm.

"The Centrex Call Center Advantage," electronic brochure, www.nortel.com/pen/solutions/acd.html.

"Gazing into the SPC network future reveals vista of new features," Gordon and Hodges, Telephony Magazine, Mar. 21, 1983.

"Signaling System 7 Rescues antiquated billing system," Jonelit, Telephony Magazine, Dec.

(List continued on next page.)

Primary Examiner—Curtis A. Kuntz
Assistant Examiner—Rexford Barnie

[57] ABSTRACT

Communication between telecommunications networks and computer systems used by financial institutions to allow processing customer requests to pay for telecommunication services with credit cards is described. In particular, communication that allows both real-time authorization and settlement of charges needed to bill the customer is explained. In addition, a system and method for protocol conversion between a client server protocol used by telecommunications networks and a packet switching network protocol used by financial institutions is provided. Client server protocols include protocols used by caller interaction processes such as UDP/IP. Packet switching network protocols include protocols used by financial processors such as X.25. The system method of the present invention may be used for communication between other networks and computer systems that use UDP/IP in X.25.

11 Claims, 9 Drawing Sheets

OTHER PUBLICATIONS

"Smart Credit Cards: the answer to cashless shopping," Weinstein, IEEE Spectrum, Feb. 1984.

"Quick Product Index," electronic brochure, www.nortel.com/home/quick/#A.

Weinstein, S., "Smart credit cards: the answer to cashless shopping", *IEEE Spectrum*, Feb. 1984, pp. 43–49.

Joneleit, P. "Signaling System 7 rescues antiquated billing system", *Telephony*, Dec. 2, 1991, pp. 32, 34 and 36.

Gordon et al., "Gazing into the SPC network future reveals vista of new features", *Telephony*, Feb. 21, 1983, pp. 86–93.

"DMS–250 Long Distance Switch Product Information: Product Technical Overview", Northern Telecom, from http://www.nortel.com/broadband/dms/250/250information.html, Copyright 1996.

Briere, D., "The secret to success with virtual nets", *Network World*, vol. 9, No. 12, Mar. 23, 1992, pp. 1, 31 and 41–43.

VALIDATION GATEWAY

RELATED APPLICATIONS

The following applications of common assignee contain some common disclosure, and are believed to have an effective filing date identical with that of the present invention:

SYSTEM AND METHOD FOR PROVIDING OPERATOR AND CUSTOMER SERVICES FOR INTELLIGENT OVERLAY NETWORKS, incorporated herein by reference in its entirety.

ENHANCED OPERATOR CONSOLE, incorporated herein by reference in its entirety.

ADVANCED INTELLIGENT NETWORK GATEWAY, incorporated herein by reference in its entirety.

BACKGROUND OF THE INVENTION

1. Field of the Invention

The present invention relates generally to computer systems, and more particularly to providing a messaging interface between one or more computer system environments.

2. Related Art

Telecommunications network products are services provided by telephone companies that are carried on telecommunications networks. A widely known example is dial-1 long distance voice service which allows a customer to dial a 1 plus a ten digit number from his or her home telephone, talk to a party who answers the telephone on the line of the ten digit number dialed, and pay for the telephone call when billed at the end of the month. Although dial-1 is popular, other calling and payment options are sometimes preferable. For example, a calling card call allows an individual to make a call from a phone other than their home phone and charge the call to the home phone account using the calling card.

One such calling and payment option is debit calling which is also referred to as prepaid calling. Debit calling allows a customer to put funds in an account and have those funds debited each time a telephone call is made. Standard debit call processing includes verification of the account balance prior to connecting the call and ongoing balance verification during the call. An example of a typical debit calling customer is a parent who purchases a debit calling card for a child away from home.

Once a debit account is established, a customer may add funds to the debit account. Customers often add funds to their debit accounts using credit cards. To add funds, a customer contacts the telephone company by dialing a telephone number that is answered by a customer service representative or an operator and requests that funds be added to the debit account. The customer service representative or operator collects information from the customer and processes the request to add funds. In order to add funds, the customer must select a method of payment and the customer service representative or operator must obtain authorization and enter the information needed to later bill the customer.

If the customer chooses to pay for funds added to a debit account using a credit card, authorization for charges must be obtained from the financial institution that provides the credit card account to the customer. Authorization to charge to a customer's credit card account is typically obtained by accessing a computer system owned by the financial institution. The computer system typically includes a database with customer account information and one or more computer programs that can determine using the customer's account information whether to authorize billing a particular transaction to the customer's credit card account. When the financial institution authorizes a transaction, the telephone company receives an authorization response code which reflects a commitment from the financial institution that it will pay the telephone company for the services provided.

Because the computer systems used by financial institutions communicate using a different protocol than the computer systems operating on telecommunications networks, protocol conversion is needed for the computer systems operating on telecommunications networks to automatically access the computer systems used by financial institutions that authorize billing transactions. A protocol is a standard that computer programs follow to be compatible with other computer programs. Protocols determine what information is transmitted, what timing values should be associated with the transfer of information, and what format should be used to transmit the information. A standard or protocol may be used throughout the telecommunications industry or it may be owned by a private entity for use with computer systems sold or operated by that entity. Telecommunications network components are available that allow communication between the computer systems operating on the telecommunications network and the computer systems used for financial institutions for real-time authorization of charges processed by a human operator. However, these components do not allow for real-time authorization of charges processed automatically and they do not provide real-time updates to telephone company computer systems that process billing for other telecommunications products.

Computer systems used by telephone companies process billing differently than the computer systems used by financial institutions. Typically, billing for a telecommunications product cannot occur until after a call is complete because billing is dependent on the duration of the call. For example, when a customer uses a calling card with added features, such as the ability to access news and weather, the processing of the billing for the call involves a two step process. First, the computer systems of the telecommunications network that process calling cards provide a record of the use of the calling card to computer systems that process billing for the telephone company. Second, a switch, which is a component within the telecommunications network, provides the call duration information to the telephone company billing computer systems. Then, the telephone company billing computer systems reconcile these records.

However, unlike billing for a call using a calling card with added features, billing for a request to add funds to a debit account is not dependant on call duration. The customer requests to add a specified amount to a debit account. The duration of the call affects the amount of funds deducted from the account at the end of the call but not the amount added to the customer's account. Therefore, the addition of the specified amount to the debit account can be performed as a single transaction. Unfortunately, current telephone company billing computer systems are not programmed to process billing a single transaction. As a result, reconciliation of the records of the telephone company billing computer systems and the records of the financial institution's billing computer systems is currently not real-time. The process of reconciling the records of the telephone company billing computer systems and the financial institution's billing computer systems is referred to as settlement.

SUMMARY OF THE INVENTION

The system and method of the present invention provide communication between telecommunications networks and computer systems used by financial institutions in order to process customers' requests to pay for telecommunications services with their credit cards. Both real-time authorization and settlement of charges are possible with the present invention. In addition, the present invention provides protocol conversion between a client server protocol used by telecommunication networks and a X.25 protocol used by the computer systems of financial institutions. The protocol conversion allows communication for requests to bill using a credit card processed both by a human operator and automatically.

The system of the present invention comprises a validation gateway that has a computer program that provides for the transfer of messages and conversion of protocol to allow communication between the telecommunications network that received the call and the computer system used by the financial institution that provides the customer with credit card services. The validation gateway operates in an interexchange network to provide an interface between the interexchange network and computer systems owned by financial institutions. An interexchange network is a telecommunications network that provides long-distance telephone service and other telecommunications services.

The computer program on the validation gateway includes software modules that perform specified functions. Modules within the computer program of the validation gateway receive messages from and send messages to caller interaction processors. Caller interaction processors are processors that allow a human operator to interact or interact directly with a debit customer to receive call processing information from the customer. Two examples of caller interaction processors are manual operator consoles and service switching control points (SSCPs). The manual operator console is a computer that is similar to a personal computer and is operated by a human operator to provide the human operator with information necessary to request information from the customer and enter information provided by the customer to process the call. The SSCP provides automated call processing for a debit customer who uses a keypad to enter information that is received by the SSCP.

The computer program on the validation gateway also includes software modules that send messages to and receive messages from the computer systems used by financial institutions, which are referred to as financial processors. Financial processors are the computer systems used by financial institutions to authorize charges to credit card accounts. These modules act as a single point of interface for the transfer of multiple customers' messages between the validation gateway and the financial processor.

In addition, the computer program on the validation gateway includes a module that converts between the protocol used by the caller interaction processors and the protocol used by the financial processors for credit card authorization. This module accepts validation request messages in a request information format. The module stores information received in the message and builds a card request message to send to the financial processor. This module also accepts a card reply message from the financial processor, retrieves the stored information, and builds a validation response message to send to the caller interaction processor.

The method of the present invention comprises steps for receiving, converting protocol, and sending messages to process customer credit card requests. The method of the present invention includes steps for receiving a validation request message from a caller interaction processor, building a card request message that can be understood by the financial processor, and sending the card request message to the financial processor. The method of the present invention also includes steps for receiving a card reply message from the financial processor, building a validation response message that can be understood by the caller interaction processor, and sending the validation response message to the caller interaction processor.

The system and method of the present invention is not limited to processing credit card authorization requests. The caller interaction processors are clients operating on a client server network. A client server network is a network or one or more computer systems that include multiple clients which are controlled and monitored by one or more servers. In this case, the caller interaction processors are clients that are controlled and monitored by operator network center computer systems, which are servers. In addition, the present invention may be used to communicate with any processor that is accessed via a packet switching network and is not limited to accessing a financial processor. Therefore, the system and method of the present invention may provide protocol conversion between any client server protocol used by a client and any packet switching protocol used by a processor to allow message transfer.

The system and method of the present invention also allows access by financial processors to computer systems operated by the telephone company that validate calling cards, prepaid cards, and other cards provided by that telephone company. The present invention accepts requests from the network used by financial processors, typically an X.25 network, performs a protocol conversion, transmits the request to the appropriate computer system on the telecommunications network, and provides a reply to the requestor via the X.25 network. The modules of the computer program on the validation gateway perform the same functions, although in a different order, to process these requests.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

DETAILED DESCRIPTION OF THE PREFERRED EMBODIMENTS

Figure 1:
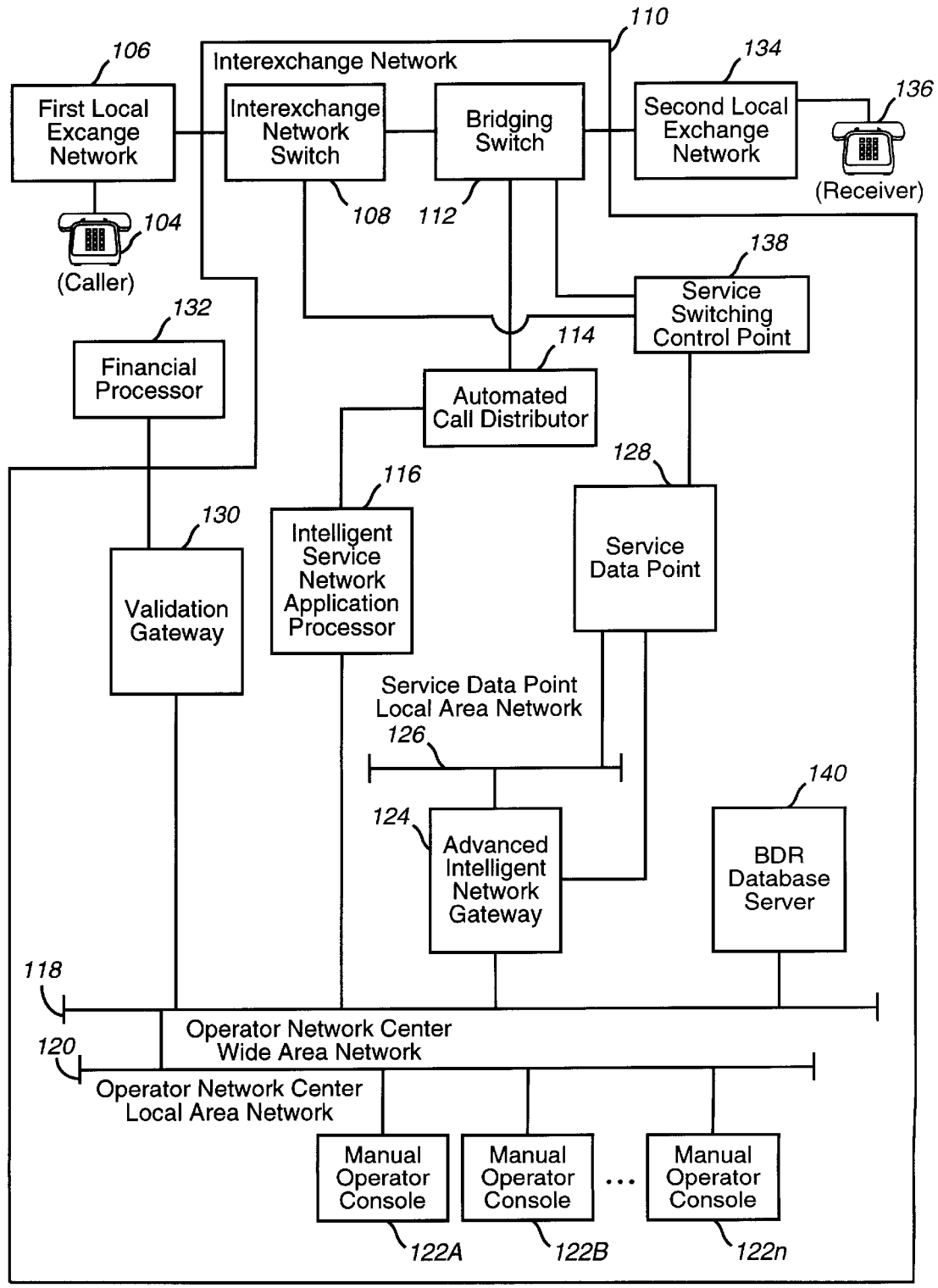
FIG. 1 is a block diagram of an interface environment of a validation gateway according to a preferred embodiment of the present invention.

FIG. 1 is a block diagram of a validation gateway interface environment 102 according to a preferred embodiment of the present invention. The validation gateway 130 provides access to the financial processor 132 to allow for credit card validation.

The validation gateway interface environment 102 is one possible environment of a validation gateway 130. The validation gateway interface environment 102 described below includes the telecommunications network necessary to process customer requests to add funds to a debit account. The validation gateway 130 allows the components of the telecommunications network to communicate with a financial processor 132. A financial processor 132 is a computer system that provides authorization of credit card charges. The financial processor 132 typically uses X.25 protocol and can be accessed via an X.25 network. A typical call may be processed manually by a human operator using a manual operator console 122A or automatically via the service switching control point (SSCP) 138.

The telecommunications network components include several telecommunications networks such as first and second local exchange networks 106 and 134 and an interexchange network 110. The interexchange network 110 comprises a plurality of switches including an interexchange network switch 108 and a bridging switch 112. In addition, within the interexchange network 110, an automated call distributor (ACD) 114, an intelligent service network applications processor (ISNAP) 116, manual operator consoles 122A, 122B, . . . 122n, an advanced intelligent network gateway (AIN) 124, a service data point (SDP) 128, and the validation gateway 130 are used to process debit customer requests to add funds to debit accounts that are handled by a human operator. If the validation request to add funds to a debit account is processed automatically, the SSCP 138, the SDP 128, the AIN 124, the validation gateway 130, and a billing data record (BDR) server 140 are used. Please refer to the attached Glossary for a reference of acronyms and their definitions.

The interface environment of a validation gateway 130 can best be described referencing the processing of a typical call. The interface environment of a validation gateway 130 will first be described with reference to a typical call that is processed manually by a human operator.

A call is placed by a debit customer using a telephone 104. The call is received by a first local exchange network 106. A first local exchange network 106 comprises switches and termination equipment within a localized area. An example of a first local exchange network 106 is a local telephone operating company network such as Bell Atlantic. The first local exchange network 106 sends the call to an interexchange switch 108A in an interexchange network 110.

Similar to the first local exchange network 106, an interexchange network 110 comprises a plurality of switches, also referred to as exchanges, that are located throughout a geographic area. However, interexchange networks 110 typically comprise of switches throughout a large geographic area to process long-distance telephone calls. For example, a national interexchange network 110 comprises switches located throughout the nation. When a call is routed to the interexchange network 110, it may be routed to one or more switches within the interexchange network.

If the call is received by an exemplary interexchange network switch 108A, the interexchange network switch 108A will route the call to a bridging switch 112A. The bridging switch 112A will then route the call to the ACD 114. Alternatively if a bridging switch 112A receives the call, the bridging switch 112A will route the call to the ACD 114. In other words, if the call is received by a bridging switch 112A, then the call may go through only the bridging switch 112A prior to being routed to the ACD 114. The switches in the interexchange network 110, including the interexchange network switch 108 and the bridging switch 112, may be implemented using DMS-250 switches manufactured by Nortel.

After the bridging switch 112 sends the call to the ACD 114, the ACD 114 communicates with the ISNAP 116 to route the call to a manual operator console 122A. Exemplary manual operator console 122A allows a human operator to handle one individual debit call. Manual operator consoles 122 are logically defined in software as being in groups. The ISNAP 116 selects a manual operator console 122A and ensures that incoming calls are distributed among the logically defined groups. The ACD 114 provides switching functionality between the selected manual operator console 122A and the interexchange network 110. The ACD 114 may be implemented using the automated call distributor manufactured by Nortel.

The ISNAP 116 communicates to the manual operator consoles 122 via operator network center computer systems. The preferred embodiment of the present invention includes two operator network center computer systems, an operator network center wide area network (WAN) 118 and an operator network center local area network (LAN) 120. The operator network center WAN 118 and the operator center LAN 120 assist the ISNAP 116 in directing the call to a manual operator console 122A. In addition, the operator center WAN 118 and the operator center LAN 120 store information used to process calls. The manual operator consoles 122 communicate with the operator network center WAN 1 18 and LAN 120 using UDP/IP.

The manual operator consoles 122 are computer consoles that receive information from the operator network center WAN 118 and the operator network center LAN 120 and provide the human operator (not shown) with the information to address the debit customer's call. Unfortunately, the operator network center WAN 118 and the operator network center LAN 120 do not include debit customer account information. The manual operator consoles 122 need access to another computer system in order to obtain debit customer account information.

The SDP 128 stores debit customer account information used for traffic handling, service provisioning, and billing of debit calls. In accordance with the present invention, the manual operator console 122 accesses the SDP 128 via the AIN 124 and the SDP LAN 128. In addition, the AIN 124 also provides protocol conversion between transmission control protocol/internet protocol (TCP/IP) used by the SDP 128 and user datagram protocol/internet protocol (UDP/IP) used by the manual operator consoles 122. The AIN 124 is described in further detail in copending U.S. Application, entitled "Advanced Intelligent Network Gateway" incorporated by reference herein.

The selected manual operator console 122A uses information received from the SDP 128 to process the call. If the customer is placing a debit call does not have sufficient funds in his or her debit account, and wants to use a credit card to add funds, the manual operator console must obtain authorization for the customer to charge to the credit card. Authorization of credit card charges is done by a financial processor 132. The financial processor 132 is accessed to process the customer's request, referred to interchangeably herein as a validation request, via the validation gateway 130.

The validation gateway 130 translates between UDP/IP used by the manual operator consoles 122 and X.25 protocol used by the financial processor 132. The validation gateway 130 has a computer program referred to as a validation computer program, also referred to as a validation application (VALID_APP), which performs message transfer and protocol conversion needed for a message to flow between the manual operator console 122A and the financial processor 132. VALID_APP includes software modules that interface with the manual operator consoles 122A, perform protocol conversion, and interface with the X.25 network used by the financial processor 132.

The preferred embodiment of the present invention performs translation between UDP/IP protocol and X.25 protocol. However, the present invention may perform protocol conversion between any client server protocol and any packet switching network protocol. A client server protocol is a protocol that is used by a client server network, such as UDP/IP. A packet switching network protocol is a protocol, such as X.25, that is used by a packet switching network. Therefore, the system and method of the present invention may provide message transfer and protocol conversion to any packet switching network protocol and is not limited to X.25 protocol. Although the system and method of the present invention is described with regards to X.25 protocol, the term X.25 protocol should be understood to refer to any protocol used by a packet switching network.

VALID_APP performs the protocol conversion by building a card request message from a validation request message and by building a validation reply message from a card reply message. Initially, the manual operator console 122A sends a validation request message to request authorization to bill to a customer's credit card. The validation request message contains transaction data such as the customer's credit card account number, the credit card type, the expiration date of the credit card, and the amount the customer wishes to charge to the credit card. The validation gateway converts the validation request message to a card request message which is sent to the financial processor 132. When the financial processor 132 has determined whether to authorize the transaction, the financial processor 132 sends a card reply message to the validation gateway 130. The validation gateway 130 performs a similar function of converting the card reply message to a validation reply message. The validation gateway then sends the validation reply message to the manual operator console 122A. The present invention is not limited to providing a protocol conversion for an authorization of a request to bill to a customer's credit card. Therefore, the term card request message should be understood to refer to any request message sent by a validation gateway 130 to a packet switching network. Likewise, the term card reply message should be understood to refer to any reply message received by a validation gateway from a packet switching, network. The message flow between the manual operator console 122A and the validation gateway 130 will be described in more detail in the figures below.

The financial processor 132 is a computer system that includes a database that stores credit card account information for credit card accounts. Merchants and companies that accept credit cards purchase the services of a company that owns the capability to access financial processors such as exemplary financial processor 132. The company or bank maintains credit card information and guarantees that a merchant will be paid for an authorized transaction. When a request to charge to a customer's credit card is authorized, the merchant receives an authorization response code which can be used to ensure that the merchant will receive payment for the authorized transaction. When the financial processor 132 receives a card request message from the validation gateway 130, it either authorizes or rejects the transaction and responds with a card reply message to the validation gateway 130 including an authorization response code authorizing the charges or explaining why authorization was rejected. The flow and format of the card request message and card reply message sent between the validation gateway 130 and the financial processor 132 will be described in more detail in the figures below.

After the manual operator console 122A has completed processing the call, it releases the call back to the bridging switch 112 via the ACD 114. The bridging switch 112 connects the call to the receiver 136 via a second local exchange network 134. Similar to a first local exchange network 106, a second local exchange network 134 comprises switches and termination equipment within a localized area. The example used in illustrating a first local exchange network 106, a local Bell operating company network such as Bell Atlantic, also applies to a second local exchange network 134.

As mentioned previously, a typical call may be processed manually by a human operator using a manual operator console 122A or automatically via a SSCP 138. The processing of an automated call is similar to that of a call processed manually by a human operator in that both calls originate at a telephone 104, access a first local exchange network 106, and access an interexchange network switch 108 or bridging switch 112 in an interexchange network 110. However, automated debit calls are not routed to a manual operator console 122A via an ACD 114, an ISNAP 116, an operator network center WAN 118 and an operator center LAN 120. Automated debit calls are routed from the bridging switch 112 directly to a SSCP 138.

The SSCP 138 comprises switching and automated response capability. The SSCP 138 receives a call from a bridging switch in much the same way as the ACD 114. However, unlike the ACD 114, the call does not need to be routed to a manual operator console 122A. The SSCP 138 has automated response capability that can prompt the caller for the information needed much in the same way as a human operator of the manual operator console. The SSCP 138 receives the information from the caller and has the ability to process the call using the information. The SSCP 138 may be implemented using an Ericsson AXE-10 switched based platform with an automated response unit (ARU) enhancement.

Similar to the manual operator console 122A, the SSCP 138 needs debit customer account information to process the debit call. Like the manual operator console 122A, the SSCP 138 obtains this information from the SDP 128. If the SDP 128 indicates that additional funds are needed in a debit account, the SSCP 138 will prompt the caller to determine if the caller would like to add finds to the debit account. If the caller would like to add funds to the debit account, the SSCP 138 accesses the financial processor 132 to validate the credit card via the AIN 124 and the validation gateway 130.

Because the AIN 124 performs protocol conversion between TCP/IP and UDP/IP, the validation gateway 130 performs protocol conversion between UDP/IP and X.25. Similar to a call processed by a manual operator console 122A, VALID_APP performs protocol conversion between UDP/IP and X.25 by building a card request message from a validation request message and building a validation reply message from a card reply message. When the call is processed by the SSCP 138, the SSCP 138 sends a validation request message to request authorization to bill to a customer's credit card. The validation request message received by the validation gateway 130 is in the same format and contains the same data fields as the message received from manual operator console 122A.

Like the call that is processed manually by a human operator using a manual operator console 122A, when credit card validation is complete and funds are added to the customers debit account, the call is released back to the bridging switch 112 and is terminated via a second local exchange network 134 to a telephone 136.

Figure 2:
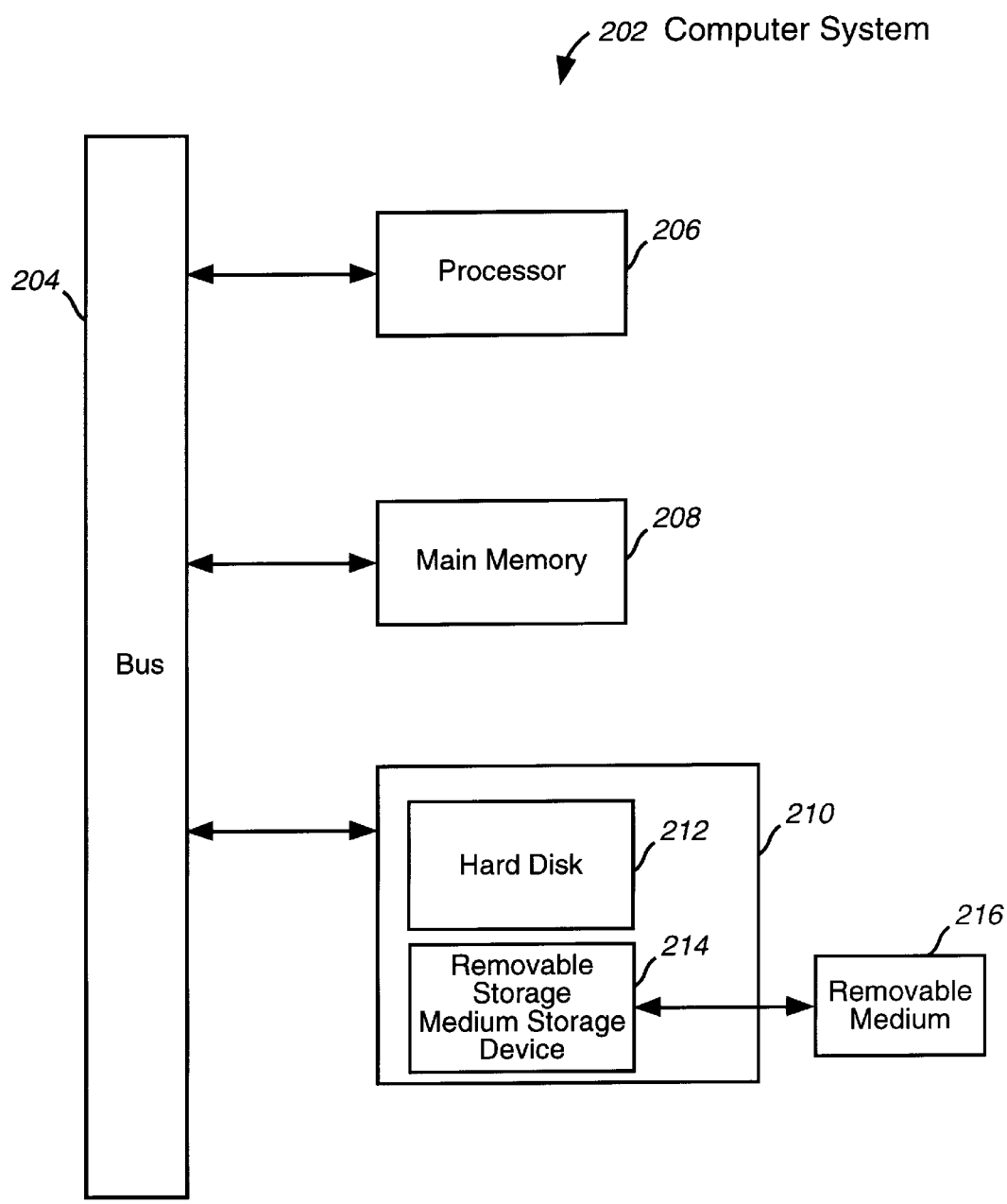
FIG. 2 is a block diagram of the structure of a validation gateway of the interface environment of FIG. 1 according to a preferred embodiment of the present invention.

The validation gateway 130 of the present invention is preferably implemented using a computer system 202 as shown in block diagram form in FIG. 2. The computer system 202 includes one or more processors, such as processor 206 connected to bus 204. Also connected to bus 204 is main memory 208 (preferably random access memory, RAM) and secondary storage devices 210. The secondary storage devices 210 include, for example, a hard drive 212 and a removable storage medium drive 214 (such as a disk drive, for example).

The VALID_APP is preferably a computer program that resides in main memory 208 while executing. When executing, this computer program enables the computer system 202 to perform the features of the present invention as discussed herein. Thus, the VALID_APP represents a controller of the computer system 202 (and of the processor 206). Alternatively, the VALID_APP is predominately or entirely a hardware device, such as a hardware state machine.

In one embodiment, the present invention is a computer program product (such as removable storage medium 216, representing a computer storage disk, compact disk, etc.) comprising a computer readable media having control logic recorded thereon. The control logic, when loaded into main memory 208 and executed by processor 206, enables the processor 206 to perform the operations described herein.

Figure 3:
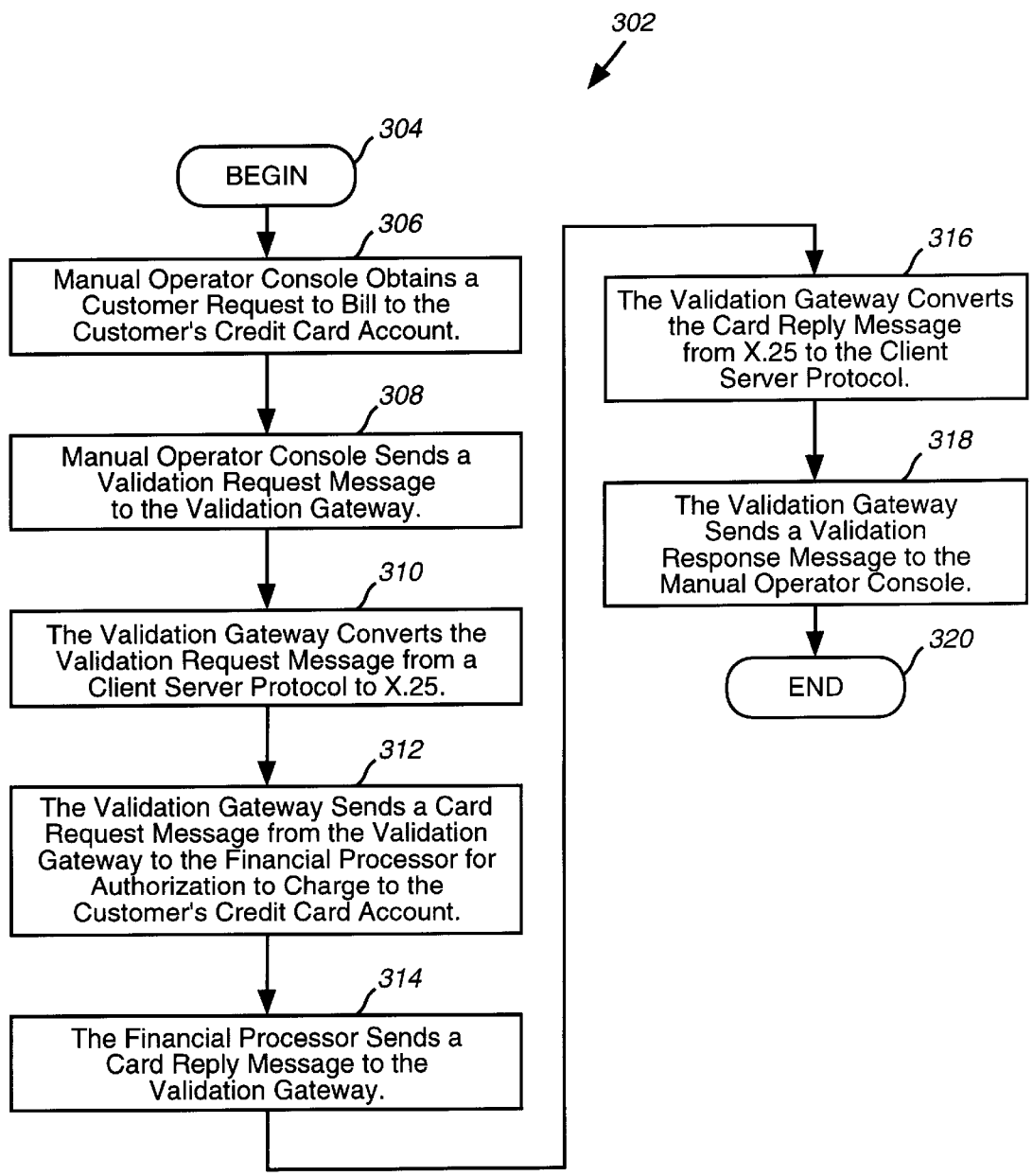
FIG. 3 illustrates the message flow between a manual operator console and the financial processor according to a preferred embodiment of the present invention.

FIG. 3 illustrates the manual operator console 122A-financial processor 132 message flow 302. Messages sent between the manual operator console 122A and the financial processor 132 are transmitted via the validation gateway 130. VALID_APP, which is the validation computer program on the validation gateway 130, performs the message transfer and protocol conversion needed for a message to flow between the manual operator console 122A and a financial processor 132. Prior to describing the manual operator console 122A-financial processor 132 message flow 302, an overview of the message flow between the manual operator console 122A and the financial processor 132 is provided highlighting the functions of the multiple software modules of the VALID_APP computer program.

The manual operator console 122A-financial processor 132 message flow 302 comprises a two part transaction including: (1) an authorization request sent from the manual operator console 122A to the financial processor 132 and (2) a reply, with an authorization or rejection, from the financial processor 132 to the manual operator console 122A. Multiple software modules included in the VALID_APP computer program interface with the manual operator console 122A, perform protocol conversion between UDP/IP used by the manual operator console 122A and X.25 protocol used by the financial processor, and interface with the X.25 network used by the financial processor 132.

VALID_APP includes a client receive module referred to as the user datagram protocol/internet protocol receive (UDP_RECV) module and a client send module referred to as the user datagram protocol/internet protocol (UDP_SEND) module that interface with the manual operator console 122A. A client receive module is a validation computer program module that receives requests from clients, such as caller interaction processors. A client send module is a validation computer program module that sends replies to clients. The UDP_RECV module accepts requests for authorization of credit card charges from manual operator consoles 122. The UDP_SEND module sends responses, including authorization or rejection of the credit card charge, received from the financial processor 132 to the manual operator consoles 122. Both UDP_RECV and UDP_SEND are single points of interface for all manual operator consoles 122 and for the SSCP 138.

VALID_APP also includes a validation module referred to as a validation process (VALID_PROCESS) module. A validation module is a validation computer program module that performs protocol conversion needed for message transfer between clients and processors. The VALID_PROCESS module performs protocol conversion needed for communication between the manual operator console 122A and the financial processor 132. When the UDP_RECV module receives a validation request message requesting authorization of creditcard charges from the manual operator console 122A, VALID_PROCESS builds a card request message to send to the financial processor 132. When the financial processor 132 sends a card reply message either authorizing or rejecting charges associated with a particular transaction, VALID_PROCESS builds a validation response message to send via the UDP_SEND module to the manual operator console 122A.

An additional module within the VALID_APP computer program is a communications module referred to as X.25 communications process (X.25 COMM_PROCESS) module. A communications module is a validation computer program module that interfaces with a packet switching network, such as the X.25 network. A communications module is not limited to interfacing with an X.25 network but may interface with a processor via any packet switching network. The X.25 COMM_PROCESS module interacts with the financial processor 132. The X.25 COMM_PROCESS module sends card request messages to the financial processor 132. In addition, the X.25 COMM_PROCESS module forks out a child process which accepts card reply messages, with an authorization or rejection, from the financial processor 132.

When a module forks out another module, the initial module, also referred to as a parent module, temporarily creates the second module, also referred to as a child module. The second module is typically temporarily created to handle a particular transaction and then exits so that one module, the parent module, remains.

In step 306, the manual operator obtains a validation request to bill to the customer's credit card account. The customer calling on a telephone 104 is received by a manual operator console 122A as described above. A human operator operates the manual operator console 122A. The human operator collects transaction data from the customer. Transaction data is any data needed by the processor to perform the transaction. Transaction data to perform a customer request to charge to a credit card includes a customer credit card number, credit card type i.e., Visa, MasterCard, American Express, and expiration date. Transaction data may also include the customer's address or zip code for verification. In addition, an authorization amount which is the amount to be billed to the customer's credit card is provided by the customer and is included in transaction data. The human operator enters the transaction data obtained from the customer in the manual operator console 122A.

In step 308, the manual operator console 122A sends a validation request message to the validation gateway 130. The manual operator console 122A populates fields in a validation request message, also referred to interchangeably herein as a request information message, with the transaction data obtained by the customer. The format for the validation request message is referred to as request information message format and is shown in Table 1 below.

The validation request message includes fields, referred to as validation request fields, that are populated with transaction data to identify the call, the customer, and the merchant. The request information message format includes a field referred to as achMerchantID which is 16 characters. The achMerchantID field is populated with a merchant identifier and a customer credit card account identifier. A merchant identifier identifies the merchant that is providing the services that the customer is paying for using his or her credit card. The customer credit card account identifier, referred to interchangeably herein as a customer credit card account number, is typically a number 11–15 digits long that identifies a customer credit card account. In addition, the request information message format includes a 2 character achCardType field which is populated with the type of credit card the customer is using, a 4 character achExpDate field which is populated with the expiration date of the customer credit card, and a 9 character achZipCode field which is populated with the customer's zip code. The request information message also includes an authorization amount field entitled achAuthAmtLong which is 9 characters and is populated with the amount authorized by the customer.

Additional transaction data included in the validation request fields of the validation request message is used to identify and route the call. An example is the telephone number that the customer called from which is referred to as the call from number. The call from number is populated in the 16 character achCallFromNumber field. Another example of transaction data is the number the customer is calling, also referred to as the called to number, which is populated in the 16 character achCallToNumber field. Additional transaction data is populated in the validation request fields of the validation request message as is shown in Table 1 below.

TABLE 1

| REQUEST-INFO | DEFINITION |
| --- | --- |
| chPcktType | Type of validation packet 0-Req 1-Res 2-Force |
| achReqType(2) | validation type 0-BOC 1-Collect 2-Third party 3-Bankcard 4-Vnet 5-ICCN 6-ANET |
| achNumber(24) | phone # or card # (truncated to 22 in pack_telic) |
| achPin(4) | Personal Id Number |
| achExpDate(4) | expiration date |
| achAuthAmt(4) | authorization amount |

TABLE 1-continued

| REQUEST-INFO | DEFINITION |
| --- | --- |
| achConsNum(3) | old console number |
| achSiteNum(2) | old site number |
| achResponse(4) | response from validator |
| achZipCode(9) | Customer zip code |
| achCallFromNumber(16) | Number customer is calling from |
| achCallToNumber(16) | Number customer is calling to |
| achCardType(2) | Credit card call type Visa, etc. |
| achAuthCode(6) | Authorization code from NDC |
| achAuthCenter(2) | Source of Authorization code |
| chPosIndicator | Point of access indicator |
| achCustSubAcctNum(10) | Customer sub account number used for billing |
| achServProvID(4) | Service Provider ID |
| sServiceType | Type of service provider 1-VALLIDB1 2-VALLIDB2 3-VALCSI 4-VALNDC 5-VALDAP1 6-VALDAP2 7-VALHKT 8-VALICCN 9-VALCARDTEL 10-VALAOCT 11-VALBT 12-VALGLOBAL 16-VALCLAIR 17-VALCLAIRT |
| chMsgType | Message Type of DAP type requests |
| achSwitchID(3) | Switch ID |
| achTrunkGroup(5) | Trunk Group |
| chANINatureofCall | ANI nature of call for DAP validation |
| chAddressNatOfCall | Address Digit nature of call for DAP validation |
| chRestrictIndicator | Provides nature of card restriction |
| chServiceIdentifier | Indicates service for which card is being charged |
| chDapActionCode | Action code response from DAP |
| chDapDividACIFCode | ACIF code response from DAP |
| chAMACode | AMA Code used in OSR billing |
| achReserved1(5) | Future use |
| achReserved2(3) | Future use |
| chSuppCodeLength | Binary field which is num of supp code digits |
| achSuppCode(35) | Used in ONAT call request and Supp Code Resp |
| achBusinessGroup(7) | Used in ONAT call request and Supp Code Resp |
| chNatSubAddress | Nature of Address Indicator found in sub addr |
| achSubAddress(30) | Used in Supp Code Resp packet |
| achRoutingInfo(2) | Binary number used in Supp Code Resp packet |
| achPartitionNum(2) | Binary number used in Supp Code Resp packet |
| chNoAnswerTimer | Binary number used in Supp Code Resp packet |
| achNCSInfo(30) | Used in Supp Code Resp packet |
| achTerminationID(15) | Used in Route Resp packet |
| achConsNumLong(4) | |
| achSiteNumLong(3) | |
| achMerchantID(16) | NEW FIELD - MERCHANT ID |
| achAuthAmtLong(9) | LARGER AUTHORIZATION AMOUNT FIELD FOR ANSWERNET*** |

In step 310, the validation gateway 130 converts the validation request message from a client server protocol to X.25 In this case, the client server protocol used by the manual operator console is UDP/IP.

Figure 4:
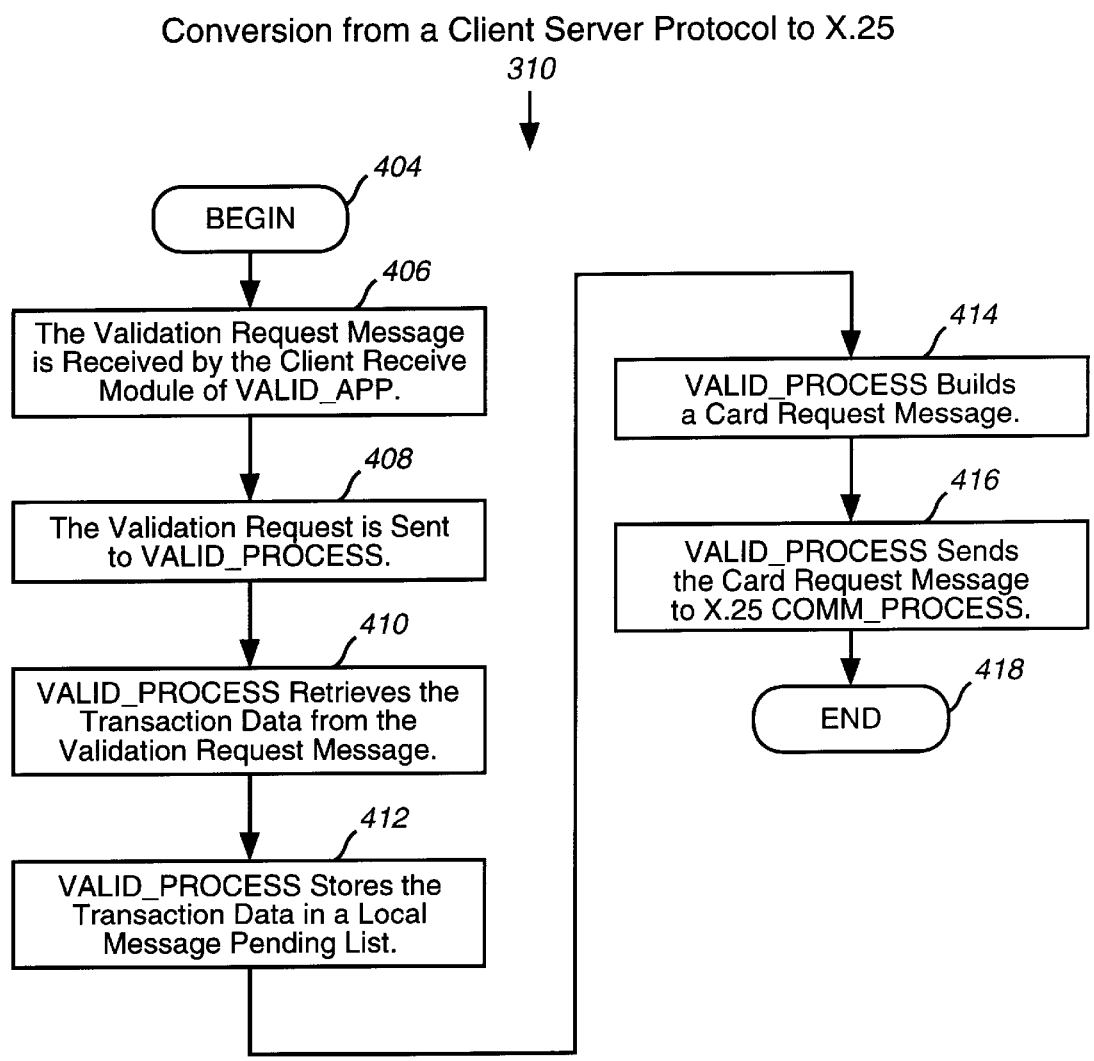
FIG. 4 illustrates the protocol conversion from a client server protocol to X.25 according to a preferred embodiment of the present invention.

The protocol conversion is performed by multiple software modules of the VALID_APP computer program on the validation gateway 130. The validation request message is received by the UDP_RECV module of the VALID_APP computer program. The UDP_RECV module sends the validation request message to the VALID_PROCESS module which performs conversion from UDP/IP to X.25 The protocol conversion is performed by VALID_PROCESS building card request message to send to the financial processor 132. Further details of the protocol conversion and function of the software modules of the VALID_APP computer program are illustrated in FIG. 4.

In step 312, the validation gateway 130 sends the card request message from the validation gateway to the financial processor 132 for authorization to charge to the customer's credit card account. The X.25 COMM_PROCESS module sends card request messages to the financial processor 132. In addition, the X.25 COMM_PROCESS module forks out a child process which accepts card reply messages, with authorization data which is an authorization or rejection, from the financial processor 132.

Although the X.25 COMM_PROCESS module is the primary module used for sending card request messages, the process of sending the message from the communications module involves several modules that are forked out from the X.25 COMM_PROCESS module. The process of sending card request messages varies depending on whether the card request message is sent over a permanent virtual circuit or switched virtual circuit. A permanent virtual circuit is initialized upon system startup and remains as a permanent link between the validation gateway 130 and an X.25 node (not shown) on the X.25 network which interconnects the validation gateway 130 to the financial processor 132. A permanent virtual circuit remains as a permanent link until the system is shutdown. A switched virtual circuit is initialized when a card request message is initiated and terminated upon transmission of the validation response message, which completes the particular validation transaction.

If a permanent virtual circuit is used to transmit a card request message, the X.25 COMM_PROCESS module sends the card request message via the permanent virtual circuit on the X.25 network to the financial processor 132.

If a switched virtual circuit is used to transmit a card request message, the X.25 COMM_PROCESS forks out a X.25 service out module. The X.25 service out module requests an X.25 link from the X.25 network that can provide interconnection with the financial processor 132. The X.25 COMM_PROCESS sends the card request message to the X.25 service out module. The X.25 service out module sends the card request message to the financial processor 132 via the switched virtual circuit provided on the X.25 network.

In step 314, the financial processor 132 sends a card reply message to the validation gateway 130. The validation gateway 130 receives the card reply message in the communications module of the VALID_APP computer program on the validation gateway 130.

If a permanent virtual circuit was used to transmit the card request message, the card reply message is received on the same permanent virtual circuit. The card reply message is received by the X.25 COMM_PROCESS. The X.25 COMM_PROCESS sends the card reply message to VALID_PROCESS.

If a switched virtual circuit is used to transmit a card request message, the card reply message is received on the same switched virtual circuit. The card reply message is received by the X.25 service out module. The X.25 service out module sends the card reply message to VALID_PROCESS. The X.25 service out module also sends a response received message to the X.25 COMM_PROCESS. The X.25 service out module is used only for a particular validation transaction.

Figure 5:
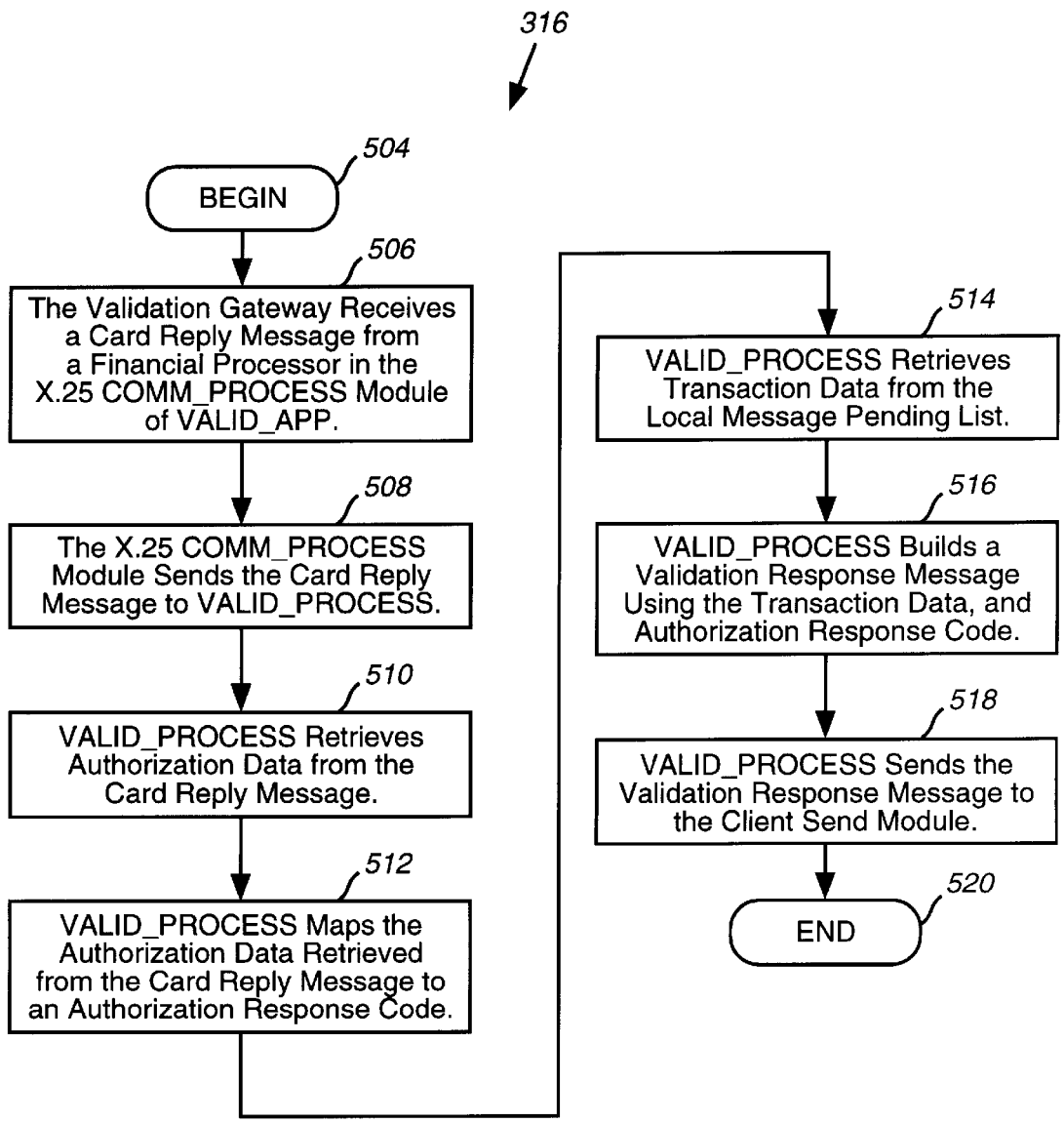
FIG. 5 illustrates the protocol conversion from X.25 to a client server protocol according to a preferred embodiment of the present invention.

In step 316, the validation gateway 130 converts the card reply message from the X.25 protocol to the client server protocol. VALID_APP receives the card reply message from the financial processor in the communications module. The communications module sends the card reply message to the VALID_PROCESS module to perform protocol conversion. VALID_PROCESS builds a validation response message and sends the validation response message to UDP_SEND. Further detail of the protocol conversion and function of the software modules of the VALID_APP computer program is illustrated in FIG. 5.

In step 318, the validation gateway 130 sends a validation response message to the manual operator console 122A. The validation response message includes an authorization response code which the manual operator console 122A uses to determine if the customer is authorized to pay for the amount requested using the credit card. The operator enters information into the manual operator console 122A to send a message to the SDP 128 to update the customer's account to the new amount the customer can use for prepaid calling.

FIG. 4 illustrates in more detail the conversion from a client server protocol to a X.25 protocol 310. In the preferred embodiment of the present the conversion the protocol conversion that is performed is between UDP/IP and X.25.

In the preferred embodiment of the present invention, the validation gateway 130 interfaces with either a manual operator console 122A or the AIN 124 that communicates with the SSCP 138. Both the manual operator console 122A and the AIN 124 communicate with the validation gateway 130 using UDP/IP. Although the SSCP 138 uses TCP/IP, the AIN 124 performs a protocol conversion between TCP/IP and UDP/IP. Therefore, the validation gateway 130 communicates with both types of caller interaction processors, the manual operator consoles 122 and the SSCP 138, using UDP/IP. As a result, the client server protocol in the preferred embodiment of the present invention is UDP/IP regardless of whether the caller interaction processor is a manual operator console 112A or the SSCP 138. In addition, the protocol conversion is performed as is described with respect to FIG. 4 regardless of whether the call is received from the manual operator console 122A or the SSCP 138.

In step 406, the validation request message is received by the client receive module of the VALID_APP computer program. The client receive module is the module within the VALID_APP that receives validation messages from the caller interaction processors such as the manual operator consoles 122 of the SSCP 138. The client receive module is referred to as UDP_RECV when it is specialized for receiving messages from client server networks using UDP/IP protocol as in this case. The UDP_RECV module is a single interface point for all caller interaction processors including the manual operator consoles 122 and the SSCP 138. The UDP_RECV module receives validation request messages from both types of caller interaction processors, the manual operator consoles 122 and the SSCP 138.

In step 408, the validation request is sent to the validation module, also referred to as VALID_PROCESS of the VALID_APP. VALID_PROCESS receives the validation request message in the request information format described in Table 1 from the client receive module. VALID PROCESS creates a card request message, using data in the validation request message. The card request message is in a format that can be understood by the financial processor 132.

In step 410, VALID_PROCESS retrieves the transaction data from the validation request fields of the validation request message. The transaction data includes the merchant identifier and customer credit card account identifier retrieved from the ach Merchant ID field, the type of credit card the customer is using retrieved from the achCardType field, the customer credit card expiration date which is retrieved from the achExpDate field, the customer's zip code retrieved from the achZipCode field, and the amount the customer authorizes to bill to the credit card retrieved from the achAuthAmt field. The transaction data also includes the number that the customer called to which is retrieved from the achCallToNumber field and the number the customer called from which is retrieved the achCallFromNumber field. Additional transaction data is retrieved as is shown in Table 1 above.

In step 412, VALID_PROCESS stores the transaction data in a local message pending list. A local message pending list is a series of addresses associated with memory for temporary use for storing data. VALID_PROCESS stores the transaction data in the local message pending list while creating the card request message in that format that can be sent to the financial processor 132.

In step 414, VALID_PROCESS builds a card request message. Because the validation request message cannot be understood by the financial processor 132, the VALID_PROCESS builds a card request message that can be understood by the financial processor 132. The card request message includes the fields achCardType of 2 characters that is populated with the type of credit card, the achMerchantID field of 16 characters that is populated with the merchant identifier and the customer credit card account identifier, and the achExpDate field of 4 characters that is populated with the expiration date of the customer's credit card. The card request message also includes the achCallToNumber field of 16 characters which is populated with the called number and the achCallFromNumber field of 16 characters which is populated with the number called from. Additional fields are included in the card request message as shown in Table 2 below.

TABLE 2

CARD REQUEST

| REQUEST-INFO | DEFINITION |
| --- | --- |
| achMessageID(3) | Constant = "TB1" |
| achReferenceNum(6) | 2 most significant chars - NDC use, 4 least significant chars - our use |
| achCardNum(22) | Card or Phone Number. Left justified and space filled |
| achExpDate(4) | MMYY format |
| byPOSIndicator | Constant "T" |
| achAcquiringICA(6) | 4 digit ICA number with trailing zeroes |
| achTransCode(2) | Constant - "T" (telephone Transaction) |
| achAmtOfTrans(9) | XXXXXXXYY means XXXXXXX dollars and YY cents |
| byFiller | Space filled |
| achMerchantID(16) | Right justified, zero filled |
| achCardType(2) | 2 digit code per Appendix B |
| achTermTimeDate(10) | HHMMSSMMDD blank if unavailable |
| achCustRefNum(8) | Assigned by Customer, blank if unavailable |
| achAuthCenter(2) | Authorization Center, e.g., "DC" |
| achDiscData(24) | Discretionary Data. Space filled |
| achPINBlock(16) | Optional. Cardholder PIN ANSI Block. Left Justified, space filled |
| achProductCode(28) | Optional. Left Justified, Zero filled |
| achAddVerData(29) | Address Verification Data, Optional First 9 positions = 9 digit ZIP or 5 digit ZIP + 4 spaces Remaining = first 20 chars of address, LJSP |
| achCallToNumber(16) | Used by FPS to screen |
| achCallFromNumber(16) | fraudulent calls |

In step 416, VALID_PROCESS sends the card request message to a communications module referred to as X.25 COMM_PROCESS of the VALID_APP. The X.25 COMM_PROCESS sends card request messages to the financial processor 132. The X.25 COMM_PROCESS is a single point of interface for sending card request messages from the validation gateway 130 to the financial processor 132. The X.25 COMM_PROCESS sends card request messages as was described in step 312 of FIG. 3.

FIG. 5 illustrates the conversion from X.25 protocol to a client server protocol.

In step 506, the validation gateway 130 receives a card reply message from the financial processor 132 in the X.25 COMM_PROCESS module of VALID_APP. The process for receiving a card reply message is described in step 314 of FIG. 3.

In step 508, the X.25 COMM_PROCESS module sends the card reply message to VALID_PROCESS. VALID_PROCESS converts the message from a card reply message to a validation response message. In addition, similar to sending a message from the manual operator console 122A to the financial processor 132, when a message is sent from the financial processor 132 to the manual operator console 122A, VALID_PROCESS converts the message from X.25 to the client server protocol, UDP/IP. The format for the card reply message is provided in Table 3 below.

TABLE 3

CARD REPLY

| REPLY-INFO | DEFINITION |
| --- | --- |
| achMessageID(3) | Constant = "TO3" |
| achReferenceNum(6) | Transaction reference number |
| achRevQueNumber(6) | Key to reversal queue entry. If blank, transaction is not eligible for reversal |
| byRespCode | Response code per appendix B |
| achAuthcode_Reject-Reason(6) | Authorization code (if approved) or rejection reason code (if rejected) |
| achEDCJulianDay(3) | If approved, date returned |
| achActQualifier(3) | blank |
| AchTermTimeDate(10) | blank |
| AchCustRefNum(8) | blank |
| achNdcSeqNum(6) | blank |
| achCumTotal(10) | blank |
| achActNum(22) | blank |
| byAddrVerResult | 1 char code resulting from address verification |
| byAuthSrcCode | Authorization source code |
| byPOSIndicator | 'C' = Swiped, 'T' = Manually keyed, '' = none |

In step 510, VALID_PROCESS retrieves authorization data from the card reply message. Authorization data is either an authorization code or a reject reason code corresponding to a reason for the rejection. If the authorization is approved, an authorization code is retrieved from the achAuthcode_RejectReason field which is 6 characters. If the authorization was rejected, a reject reason code corresponding to the reason for the rejection is retrieved from the achAuthcode_RejectReason field which is a 6 character field. Additional authorization data includes the authorization source code which is contained in the byAuthSrcCode field.

In step 512, VALID_PROCESS maps the reply data retrieved from the card reply message to an authorization response code. The manual operator console 122A cannot process the authorization code and the reject reason code. The financial processor 132 has the capability to provide many authorization codes and response codes that are useful in various different applications. However, the manual operator console 122A needs less specificity in the reason for the authorization or rejection to process the call. VALID_PROCESS has a list of response codes that can be understood by the manual operator console 122A or SSCP 138. VALID_PROCESS maps either the authorization code or the reject reason code to an authorization response code. An authorization response code can be understood by the manual operator console 122A or the SSCP 138 and provides information indicating whether the transaction was authorized, and if not, the reason for the rejection.

In step 514, VALID_PROCESS retrieves transaction data from the local message pending list. VALID_PROCESS stored transaction data in the local message pending list during the processing of the validation request message sent from the manual operator console 122A.

In step 516, VALID_PROCESS builds a validation response message using the transaction data retrieved from the local message pending list and the response code. In step 412 of FIG. 4, VALID_PROCESS stored the transaction data in a local message pending list. VALID_PROCESS now retrieves the transaction data from the local message pending list. VALID_PROCESS builds a validation response message using the retrieved transaction data and the authorization code obtained in step 514.

In step 518, VALID_PROCESS sends the validation response message to the client send module. The client send module is capable of sending messages to client server networks such as the operator service network. In this case the client send module is referred to as the UDP_SEND module because the client server protocol is UDP/IP. The UDP_SEND module is a single point of interface for sending validation response messages to caller interaction processors. The UDP_SEND module sends validation response messages to both the manual operator consoles 122 and the SSCP 138.

Figure 6:
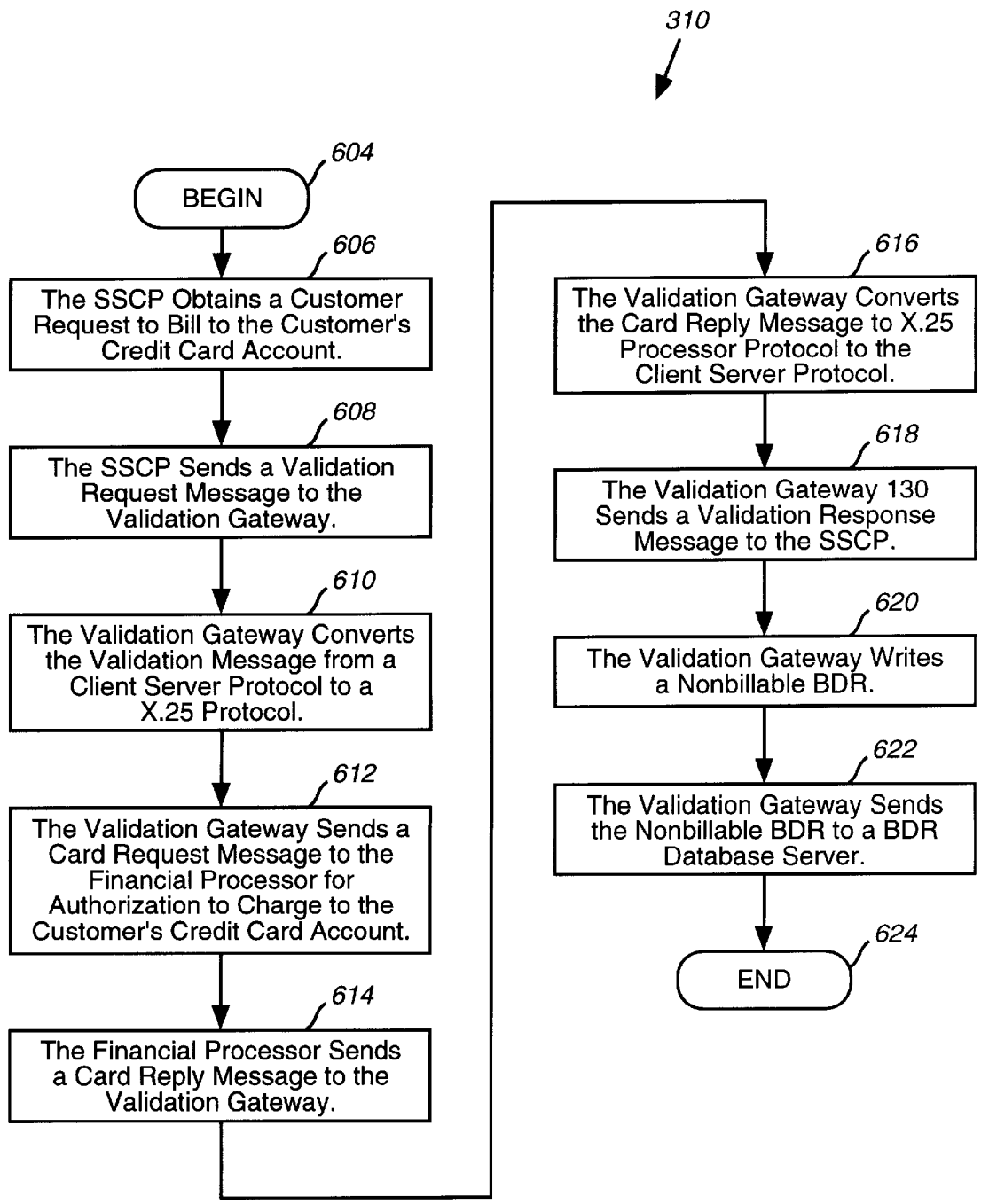
FIG. 6 illustrates the message flow between the SSCP and the financial processor according to a preferred embodiment of the present invention.

FIG. 6 illustrates the SSCP 138 financial processor 132 message flow 602. The SSCP 138 sends a message to the financial processor 132 via the AIN 124 and the validation gateway 130. The AIN 124 provides translation between TCP/IP used by the SSCP 138 and UDP/IP used by the manual operator consoles 122. The conversion process of the AIN 124 is described in further detail in U.S. Patent Application, entitled "Advanced Intelligent Network Gateway" incorporated by reference above. The validation gateway 130 translates between user UDP/IP used by the manual operator consoles 122 and X.25 protocol used by the financial processor.

In step 606, the SSCP 138 obtains a customer request, referred to as a validation request, to bill to the customer's credit card account. The customer's call is received by a SSCP 138 as described above. The customer enters transaction data using the keypad of the telephone 104. The SSCP 138 collects transaction data from the customer. Transaction data includes a customer credit card number, credit card type i.e., Visa, Mastercard, American Express, and expiration date. Transaction data may also include the customer's address or zip code for verification. In addition, an authorization amount which is the amount to be billed to the customer's credit card is provided by the customer and is included in transaction data.

In step 608, the SSCP 138 sends a validation request message to the validation gateway 130. The SSCP 138 sends the validation request message to the validation gateway 130 after querying the SDP 128. In order to allow a customer to establish a prepaid call, the SSCP 138 queries the SDP 128 to determine if the customer has sufficient funds in his or her prepaid card account to place the call. If the customer has insufficient funds, the SSCP 138 gives the customer the option to add funds using a credit card. If the customer selects to add funds to his or her prepaid card account using a credit card, the SSCP 138 collects the transaction data and sends the validation request message.

The SSCP 138 sends the validation request message to the AIN 124 for conversion from TCP/IP protocol to UDP/IP protocol. After converting the validation request message from TCP/IP protocol to UDP/IP protocol, the AN 124 sends the validation request message to the validation gateway 130.

The validation request message sent from the AIN 124 to the validation gateway 130 is in the same format and contains the same information as the validation request message sent from the manual operator console 122A to the validation gateway 130 described in FIG. 3. As with the validation request message sent from the manual operator console 122A, the validation request message sent from the AIN 124 contains transaction data obtained from the customer. Like the validation request message sent from the manual operator console 122A, the validation request message sent from the AIN 124 includes a 16 character achMerchantID field which is populated with a merchant identifier and a customer credit card account identifier, referred to interchangeably herein as a customer credit card account number. The merchant identifier identifies the merchant that is providing the services that the customer is paying for using his or her credit card account. The customer credit card account number identifies a customer credit card account. Also, like the validation request message sent from the manual operator console 122A, the validation request message sent from the AIN 124 includes a 2 character achCardType field which is populated with the type of credit card the customer is using, a 4 character achExpDate field which is populated with the expiration date of the customer credit card, and a 9 character achZipCode field which is 9 populated with the customer's zip code. In addition, like the validation request message sent from the manual operator console 122A, the validation request message sent from the AIN 124 includes an authorization amount field, achAuthAmtLong, which is 9 characters and is populated with the amount authorized by the customer.

Like the validation request message sent from the manual operator console 122A, the validation request message sent from the AIN 124 also contains additional transaction data used in processing the call. In the preferred embodiment of the present invention, the transaction data used for call processing in the validation request message sent from the SSCP 138 is the same as the transaction data used for call processing the is sent in the validation request message from the manual operator console 122A. Both the call from number and the call to number are populated in the validation request message from the AIN 124. The call from number is populated in the 16 character achCallFromNumber field. The call to number is populated in the 16 character achCallToNumber field. Additional transaction data is populated in the validation request message as is shown in Table 1 above.

In step 610, the validation gateway 130 converts the validation message from a client server protocol to a X.25 protocol. Similar to processing validation request messages sent from the manual operator console 122A, VALID_APP performs the protocol conversion. The process for protocol conversion is the same for messages sent from the manual operator console 122A and the SSCP 138. The process for converting from a client server protocol to a X.25 protocol is described in FIG. 4.

In step 612, the validation gateway 130 sends a card request message to the financial processor 132 for authorization to charge to the customer's credit card account. Similar to processing a request sent by a manual operator console 122A, the financial processor 132 authorizes or rejects the transaction using customer account information stored in a database. Similar to processing a request that originated from the manual operator console 122A, a card request message resulting from a request by the SSCP 138 may be sent to the financial processor 132 on a permanent virtual circuit or a switched virtual circuit on the X.25 network. The process for sending a card request message from the validation gateway 130 is the same whether the request originates from a manual operator console 122A or a SSCP 138. Both the process for sending a card request message from the validation gateway 130 to the financial processor 132 on a permanent virtual circuit and the processor for sending a card request message on a switched virtual circuit are described in step 312 of FIG. 3.

In step 614, the financial processor 132 sends a card reply message to the validation gateway 130. Similar to the processing of a request originating from a manual operator console 122A, the validation gateway 130 receives the card reply message in the communications module of VALID_APP. Like processing a request from a manual operator console 122A, the card request message is received by a child X.25 COMM_PROCESS if a permanent virtual circuit was used and by an X.25 service out module if a switched virtual circuit was used. The process for receiving card reply messages is the same regardless of the type of originating or terminating caller interaction processor. The process for receiving a card reply message is described in further detail in step 314 of FIG. 3.

In step 616, the validation gateway 130 converts the card reply message from X.25 protocol to the client server protocol. Like processing requests originating from and terminating to a manual operator console 122A, VALID_APP performs a protocol conversion from the X.25 protocol to the client server protocol for requests originating form and terminating to an SSCP 138. Also, like processing requests originating from and terminating to a manual operator console 122A, the client server protocol is UDP/IP because the AIN 124 converts from TCP/IP used by the SSCP 138 to UDP/IP. Further detail of the protocol conversion is illustrated in FIG. 5.

In step 618, the validation gateway 130 sends a validation response message to the SSCP 138. Like a validation response message sent to a manual operator console 122A, the validation response message to the SSCP 138 includes an authorization response code which the SSCP 138 uses to determine if the customer is authorized to pay for the amount requested using the credit card. If the customer is authorized to charge the requested amount, the SSCP 138 sends message to update the database in the SDP 128 to reflect in the customer's account the new amount that the customer can use for prepaid calling.

In step 620, the validation gateway 130 writes a non-billable billing data record (BDR). The present invention allows settlement to be complete when the credit card authorization is complete. Settlement refers to completion of processing needed to bill the customer. In prior art systems, settlement was complete when a BDR was combined with an OSR (operator service record) and was processed by billing systems. An OSR contains call time and other call related information and is written by a switch upon completion of a call. A BDR contains credit card information and is written by a manual operator console 122A. Although settlement is complete when credit card authorization is complete in the present invention, the BDR and OSR are written and sent to notify billing systems that settlement is complete.

When the call is handled by an SSCP 138, the validation gateway 130 sends a request for downstream systems to write a non-billable BDR that contains the credit card information. In order to process both calls from manual operator consoles 122, that do not have non-billable BDRs written by the validation gateway 130, and the SSCP 138, that does have a non-billable BDR written by the validation gate 130, the validation gateway must be able to determine which type of caller interaction processor sent the call. The validation gateway does not write a non-billable BDR for calls processed by the manual operator console 122A because the non-billable BDR is written by the manual operator console 122A after the validation response message is received.

The chServiceIdentifier field of the validation request message is used by the validation gateway 130 to determine whether the call was sent by a manual operator console 122A or an SSCP 138. If the chServiceIdentifier field is populated with a 1, the call was sent from the SSCP 138 and the validation gateway 130 writes a non-billable BDR. If the chServiceIdentifier field is populated with a 0, the call was sent from a manual operator console 122A and the validation gateway 130 does not write a non-billable BDR.

After the validation gateway 130 receives the validation request message, the validation gateway 130 stores information received in the validation request message, including the 0 or 1 populated in the chServiceIdentifier field, in a local message pending list. Storing of information in the local message pending list was described in step 412 of FIG. 4 which applies to processing a call from both the manual operator console 122A and the SSCP 138. When the validation gateway 130 receives a card reply message from the financial processor 132, the validation gateway retrieves the transaction data, including the 0 or 1 that was populated in the chServiceIdentifier field, from the local message pending list. The validation gateway 130 determines whether a non-billable BDR must be written based on whether the chService Identifier field is populated with a 0 or 1.

If the chService Identifier field was populated with a 1, after the validation gateway 130 sends a validation response message to the SSCP 138, the validation gateway 130 writes a non-billable BDR. A key word in a validation configuration file is used to start the process to write non-billable BDRs. Writing a non-billable BDR by the validation gateway 130 involves the validation gateway 130 sending a BDR write request to the BDR database server 140 and receiving a BDR write response from the BDR database server. The process for writing non-billable BDRs is described in further detail in FIG. 7.

In step 622, the validation gateway 130 sends the BDR write request to the BDR database server 140. The BDR database server 140 contains a database that stores non-billable BDRs. The non-billable BDR is written to that database. A network information distribution service (NIDS) database server configuration file is used to determine to which BDR server 140 to write the non-billable BDR.

Figure 7:
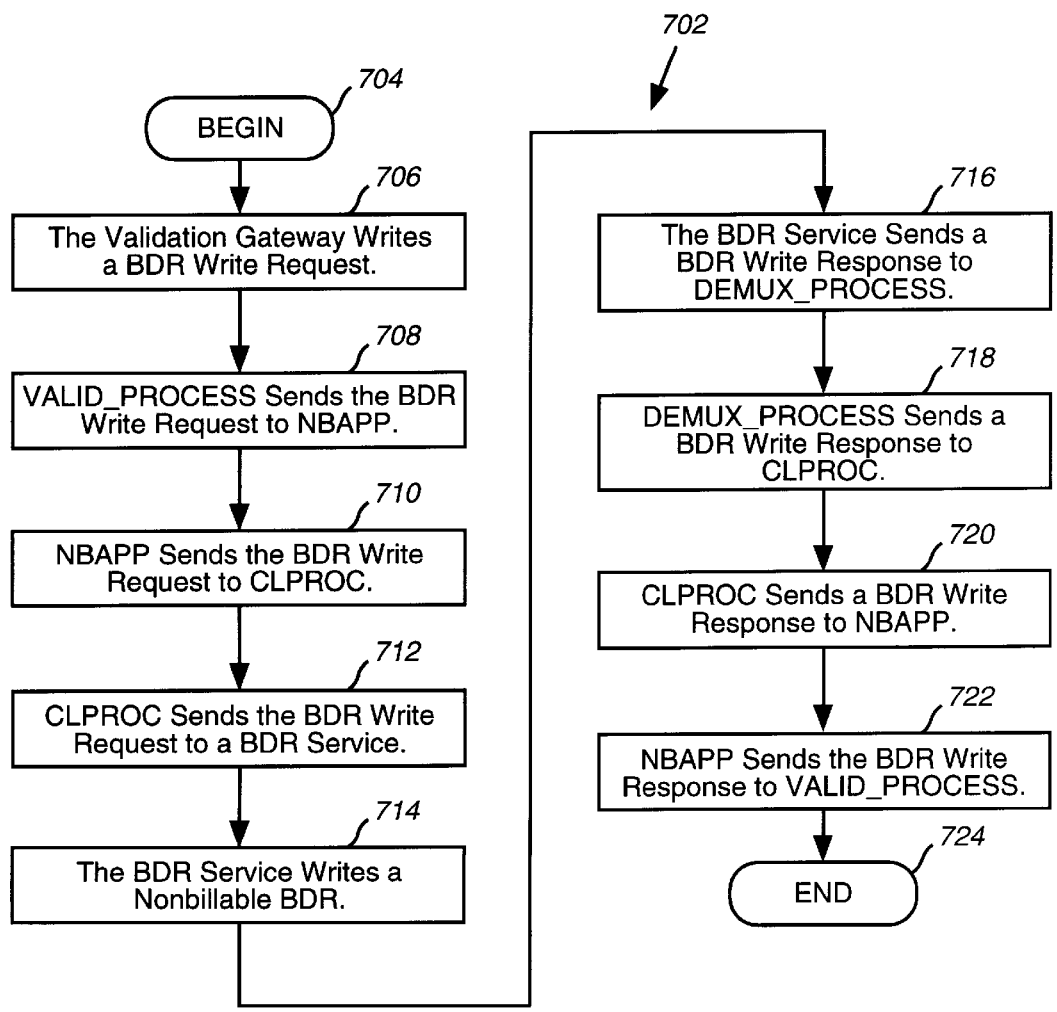
FIG. 7 illustrates the message flow for creating a billing data record by a validation gateway according to a preferred embodiment of the present invention.

FIG. 7 illustrates creating a BDR by a validation gateway 130 message flow 702. The validation gateway 130 writes a BDR for a validation request originating from an SSCP 138. As discussed in step 620 of FIG. 6, the validation gateway 130 determines that the validation request originated from an SSCP 138 if the chServiceIdentifier field is populated with a 1. Additional details of the process for determining whether the validation request message originated from an SSCP 138 are provided in step 620 of FIG. 6.

In step 706, the validation gateway 130 writes a BDR write request. The BDR write request is sent by the VALID_PROCESS module of the VALID_APP computer program on the validation gateway 130. As mentioned, a BDR contains credit card information and is used by billing systems to determine that settlement is complete. The BDR write request is a request to the BDR database server 140 to write a non-billable BDR.

In step 708, the VALID_PROCESS module sends the BDR write request to the non-blocking application(NBAPP) module. The credit card information needed to write the BDR is sent in the BDR write request. The NBAPP module is forked out by the VALID_PROCESS module to act as an interface from the VALID_PROCESS module to a client process module (CLPROC). The NBAPP module is a validation computer program module that acts as a single point of interface for all messages transferred between the VALID_PROCESS module and the CLPROC module. The NBAPP module ensures that messages sent between the VALID_PROCESS module and the CLPROC module do not block by monitoring the message and providing timing.

In step 710, NBAPP sends the BDR write request to CLPROC. The BDR database server 140 is part of the network information distribution service (NIDS). NIDS is a computer system that is also part of an interexchange network 110 and is used to perform various call processing functions for telecommunications services. NIDS uses a protocol referred to as Network Information Distribution Service (NIDS) Sequenced Packet Protocol (NSPP) protocol. Because the BDR server 140 needs the BDR write request to be in a format compatible with NSPP, the CLPROC module packages the BDR write request for NSPP. The CLPROC module is the validation computer program module that provides the NSPP interface which includes timing, packaging the message, and waiting for a response. Packaging the message in a format that can be understood by NSPP includes converting the protocol of the message, parsing the message, and converting the headers of the message.

In step 712, the CLPROC module sends the BDR write request to a BDR service. The BDR service is the computer program on the BDR database server 140 which collects BDRs to send to downstream systems for billing. In this case, because the BDR is for a credit card transaction, no billing is necessary. Settlement needed to bill the customer is completed at the time of authorization of the credit card charges by the financial processor. As a result, the BDR service creates a non-billable BDR to show that settlement has been completed. The BDR is referred to as a non-billable BDR because no billing results from the BDR.

In step 714, the BDR service writes the non-billable BDR. The non-billable BDR is stored in a database on the BDR server 140. The non-billable BDR is processed by billing systems similar to other BDRs, however, no billing results from the processing of a non-billable BDR. The non-billable BDR merely provides information that indicates settlement is complete.

In step 716, the BDR service sends a BDR write response to a demultiplex process (DEMUX_PROCESS) module. The DEMUX_PROCESS module acts as a single point of interface for validation requests from various customers. The DEMUX_PROCESS module is the validation computer program module that manages the packets received from the BDR service on the BDR database server 140 and ensures that packets are identified based on the client that sent the request. The DEMUX_PROCESS module determines which validation request is associated with a particular packet received from the BDR service. The DEMUX_PROCESS module sends the packet to a response queue corresponding to the customer that the request was received from. The BDR write request is a message that responds indicating whether the non-billable BDR was successfully written by the BDR database server 140.

In step 718, the DEMUX_PROCESS module sends a BDR write response to the CLPROC module. The CLPROC module acts as an interface for sending the message to the NBAPP module. Again, the CLPROC module provides timing and packaging of the message.

In step 720, the CLPROC module sends the BDR write response to NBAPP. NBAPP again acts as an interface between VALID_PROCESS and CLPROC.

In step 722, the NBAPP sends the BDR write response to the VALID_PROCESS module. When the VALID_PROCESS module receives the BDR write response, writing of the non-billable BDR is complete.

Figure 8:
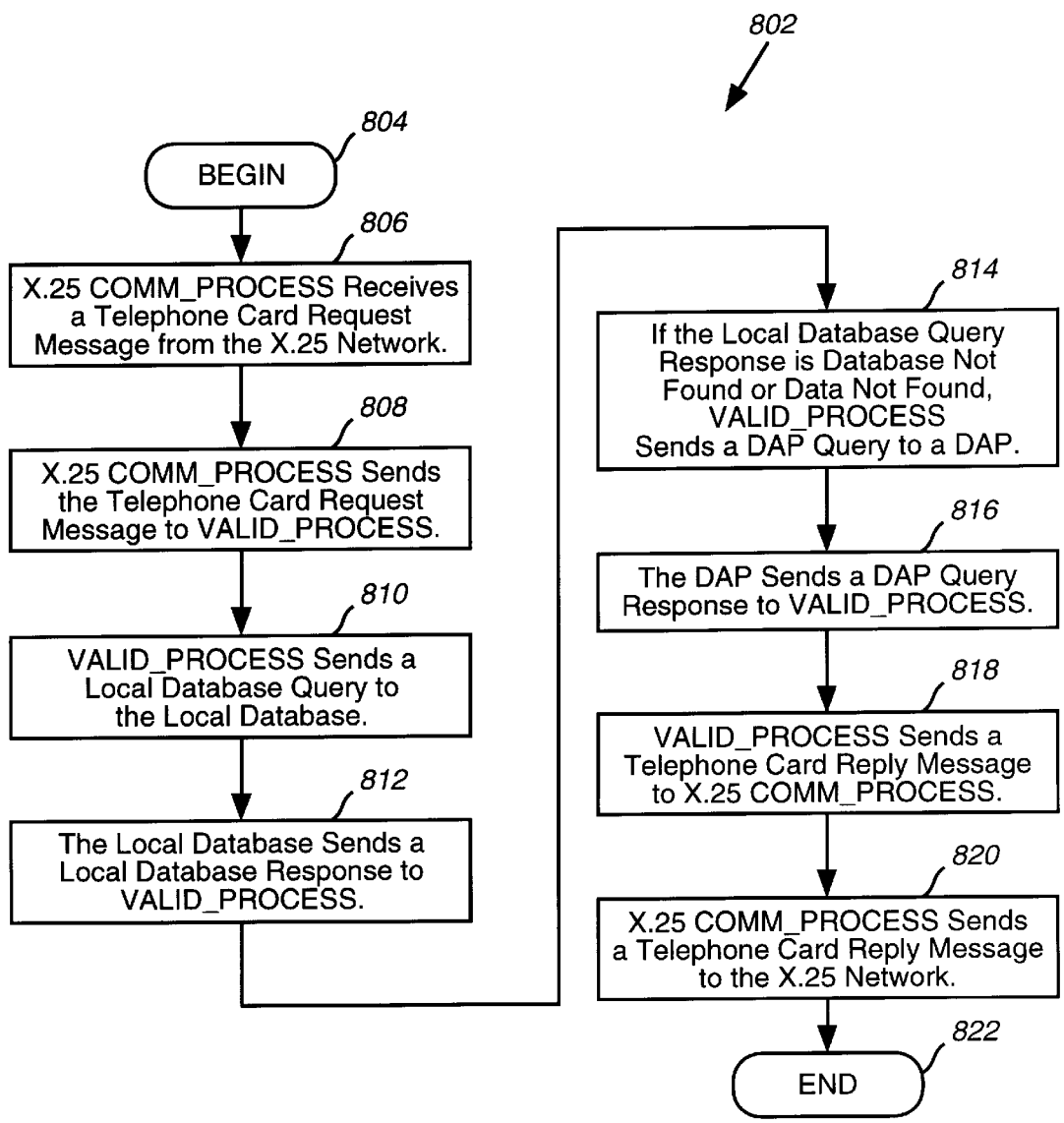
FIG. 8 illustrates the message flow for validating a request message received on an X.25 permanent virtual circuit according to a preferred embodiment of the present invention.

FIG. 8 illustrates the message flow for validating a request message received on an X.25 permanent virtual circuit. The validation gateway 130 receives a request from the X.25 network to validate a card issued by the telephone company. Examples of cards issued by a telephone company are calling cards, prepaid cards, and international calling cards. The cards are validated by computer systems on the telecommunication network. Requests to validate these cards may come from a packet switching network, such as the X.25 network, and protocol conversion is needed to enable the computer systems on telecommunications network to process the request.

Similar to requests sent from the validation gateway 130 to the packet switching network, requests sent from the packet switching network to the validation gateway 130 comprise a two part transaction including: (1) a request sent from the packet switching network to a telephone company card database and (2) a reply, with an authorization or rejection, from the telephone company card database to the packet switching network. The same software modules of the validation computer program VALID_APP are used to perform the protocol conversion from X.25 and the client server protocol used by the telephone company.

Also, similar to requests sent from the validation gateway 130, the present invention is not limited to providing a protocol conversion for an authorization of a request to use a card issued by a telephone company. The present invention may be used for protocol conversion for any request sent from a packet switching network to a client server network. Therefore, the term telephone card request message should be understood to refer to any request message sent by a packet switching network to a validation gateway 130. Likewise, the term telephone card reply message should be understood to refer to any reply message sent from a validation gateway 130 to a packet switching network.

In step 806, the X.25 COMM_PROCESS receives an telephone card request message from the X.25 network.

In step 808, the X.25 communication module sends the telephone card request message to the VALID_PROCESS module. The VALID_PROCESS module performs the protocol conversion from X.25 to the client server protocol that can be used to interface with the local database or data applications processor (DAP) to be queried. The process for protocol conversion is described with respect to FIG. 4.

In step 810, the VALID_PROCESS sends a local database query to a local database. The local database is a telephone company card database. A telephone company card database contains customer account information used in validating a card issued by a telecommunications company. Information contained in a telephone company card database includes customer account information such as customer name, calling card number, and account balance. The local database query is a query to determine using information in the local database whether the card is valid and, in the case of prepaid cards, whether sufficient funds are available in a customer's account to process a call. The local database either authorizes or rejects the customer's request to bill using the card issued by the telephone company.

In step 812, the local database sends a local database query response to the VALID_PROCESS module. The local database query response indicates whether the customer is authorized to bill using the card issued by the telephone company. However, the local database is only one type of telephone company card database. Customer account information for cards issued by a telephone company may also be maintained by a data applications processor (DAP). If the local database query is database not found or data not found, the customer account information may be stored on the DAP for that particular type of card. If the local database query contains a response, the VALID_PROCESS module next performs step 818.

In step 814, if the local database query response is database not found or data not found, VALID_PROCESS sends a data applications processor (DAP) query to the DAP. Some cards that are issued by telephone companies, such as calling cards, are not validated using local databases. These cards are validated using a database on a DAP. The DAP contains customer account information similar to the local database such as customer name, customer account number and account balance. If the response to the local database query is database not found or data not found, then the account information for the card may be maintained on the database on the DAP. Validation of the calling card is done by responding to the DAP query.

In step 816, the DAP sends a DAP query response to VALID_PROCESS. The DAP query response indicates whether the customer is authorized to bill using the card issued by the telephone company.

In step 818, VALID_PROCESS sends a telephone card reply message to the X.25 COMM_PROCESS module. VALID_PROCESS converts the message from the client server protocol to an X.25 protocol that can be understood by the computer system that sent the telephone card request message via the X.25 network. The process for protocol conversion is described in further detail with respect to FIG. 5.

In step 820, X.25 COMM_PROCESS sends a telephone card reply message to the X.25 network.

Figure 9:
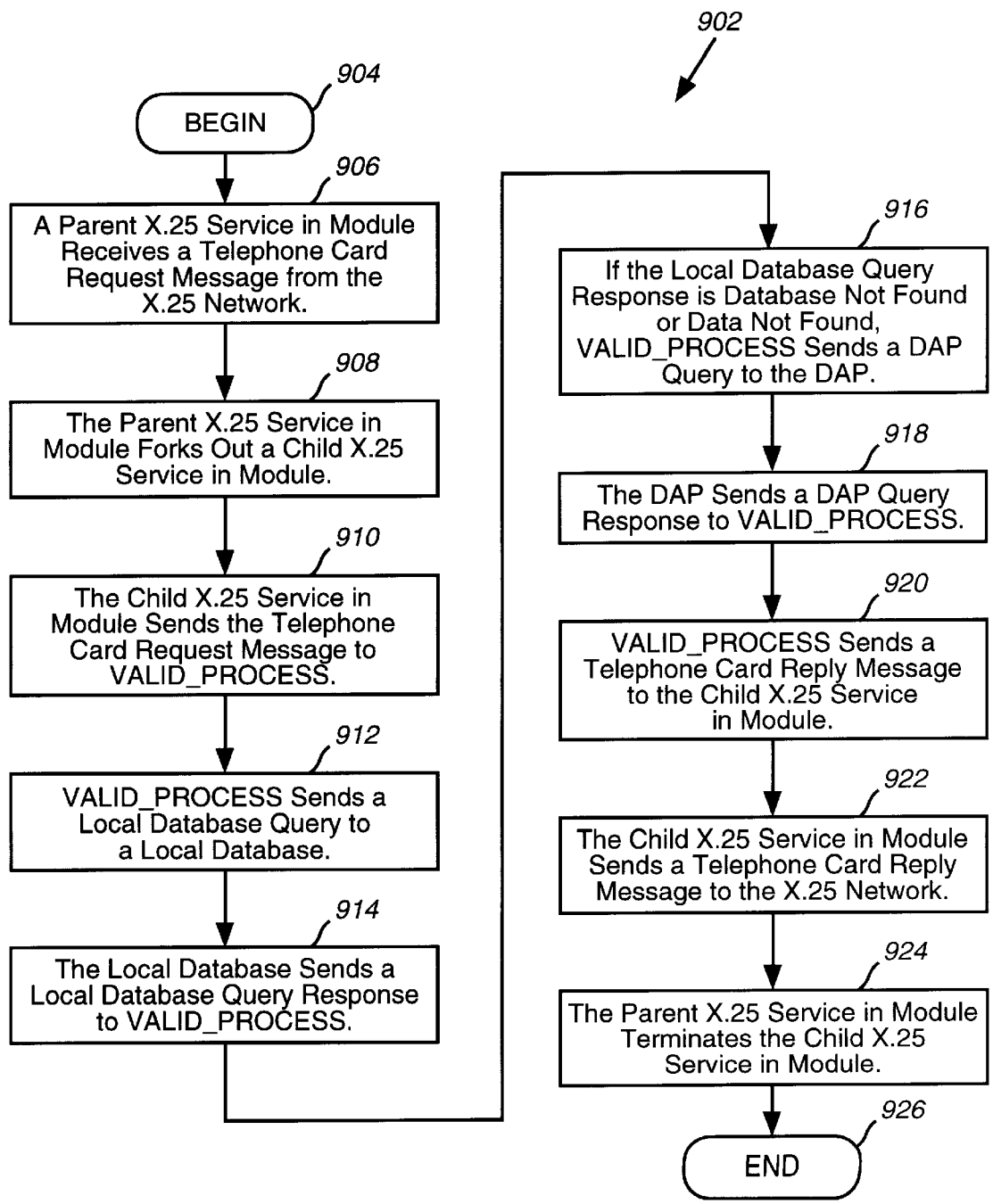
FIG. 9 illustrates the message flow for validating a request message received on an X.25 switched virtual circuit according to a preferred embodiment of the present invention.

FIG. 9 illustrates message flow for validating a request message received on an X.25 switch virtual circuit. A validation request to validate a card issued by a telephone company may be received on either a permanent virtual circuit or a switch virtual circuit from the X.25 network. If the call is received on a switch virtual circuit, the process is slightly different than if the call is received on a permanent virtual circuit.

In step 906, a parent X.25 service in module receives an telephone card request message from the X.25 network. A parent service in module is a module that is forked out by the X.25 COMM_PROCESS module. However, unlike other modules that are forked out, the parent service in module is not limited to a particular transaction. The X.25 COMM_PROCESS module forks out the parent X.25 service in module when the system is initiated and the parent X.25 service in module is used until the system is shut down.

In step 908, the parent X.25 service in module forks out a child X.25 service in module. The parent X.25 service in module sends the request message to the child X.25 service in module for processing.

In step 910, the child X.25 service in module sends the telephone card request message to VALID_PROCESS. Similar to messages requesting validation of cards issued by telephone companies that are received on permanent virtual circuits, requests that are transmitted to the validation gateway 130 on switch virtual circuits require protocol conversion. VALID_PROCESS performs the conversion from X.25 to the client server protocol used by the local database or DAP to be queried. The process for protocol conversion is described in further detail with respect to FIG. 4.

In step 912, VALID_PROCESS sends a local database query to a local database. Similar to processing requests received on permanent virtual circuits, requests received on switch virtual circuits need to access the appropriate database where customer account information is stored in order to validate or deny the request. Customer account information such as customer name, account number, and account balance are stored on a local database for some cards issued by telephone companies. The local database query is a query to determine using information in the local database whether the card is valid and, in the case of prepaid cards, whether sufficient funds are available in a customer's account to process a call. The local database either authorizes or rejects the customer's request to bill using the card issued by the telephone company.

In step 914, the local database sends a local database query response to VALID_PROCESS. The local database query response indicates whether the card issued by the telephone company is valid. Similar to processing a request received on a permanent virtual circuit, the customer account information may be stored on a DAP. If the customer account information is stored on the DAP, the local database query response is database not found or data not found. If the local database query contains a response, the VALID_PROCESS module next performs step 920.

In step 916, if the local database query response is database not found or data not found, VALID_PROCESS sends a DAP query to the DAP. Regardless of whether the card request message was received on a permanent virtual circuit or a switched virtual circuit, if the customer account information is stored on the DAP, a DAP query must be sent to the DAP for authorization.

In step 918, the DAP send a DAP query response to VALID_PROCESS. The DAP query response indicates whether the customer is authorized to bill using the card issued by the telephone company.

In step 920, VALID_PROCESS sends a telephone card reply message to the child X.25 service in module. Similar to processing of other messages, VALID_PROCESS provides protocol conversion. In this step, the protocol conversion is from the client server protocol to X.25 protocol. The process for protocol conversion is described in further detail with respect to FIG. 5.

In step 922, the child X.25 service in module sends a telephone card reply message to the X.25 network. The telephone card reply message is sent on the switch virtual circuit that was used for sending the request. Use of the switch virtual circuit ends when the transaction for a particular request is complete.

In step 924, the parent X.25 service in module terminates the child X.25 service in module. The child X.25 service in module is used for processing only one particular transaction. When that transaction is completed, the parent X.25 service in module terminates the child X.25 service in module.

The system and method of the present invention may be used in processing a validation request to pay for telecommunication services other than prepaid services with a credit card. For example, customers could pay end of the month bills using credit cards by dialing in to a manual or automated platform that accepts credit card information. Similar to the processing of requests to add funds to a debit account, the validation gateway 130 would receive the request from the telecommunications network and send the request to a financial processor 132 via an X.25 network. Processing of the request to be sent to a financial processor 132 is the same regardless of the services being paid for if validation requests are received from the AIN 124.

The system and method of the present invention is also not limited to providing an interface for transactions between interexchange networks 110 and financial processors 132. The system and method of the present invention may be used whenever communication is needed between a client server network and a network using X.25 protocol. The validation gateway can perform message transfer and protocol conversion between any computer systems requiring message transfer and client server to X.25 protocol conversion capabilities.

If the present invention is used to transfer messages that perform functions other than credit card validation, the transaction data included in the validation request and response messages and the card request and reply messages would be transaction data needed for the particular transaction. For example, if the present invention is used to perform protocol conversion for messages sent from a remote automated unit on a client server network to a database on an X.25 network to make a reservation on a particular airline flight if a seat is available, the transaction data in one embodiment of the validation request and response messages and the card request and reply messages would include a particular airline, date, and flight number.

Embodiments of the validation gateway can interface with networks using any type of client server protocol such as UDP/IP. In addition, the validation gateway is not limited to interfacing with networks using X.25 protocol. The system and method of the present invention can provide message transfer and protocol conversion for any packet switching network protocol.

In addition, the system and method of the present invention may be implemented using various formats for the validation request message, the telephone card request message, the telephone card reply message and the validation reply message. The validation request message need not be in request information format. Any format containing information needed to process a credit card request can be used. Similarly, the telephone card request message and telephone card reply messages need not be in the format specified as long as the telephone card request message and telephone card reply message contain the information necessary to obtain reply authorization and can be understood by a processor accessed via a packet switching network. In addition, the validation reply message does not need to be in request information format. Again, if the information needed to process a reply is included in the message, the format of the message can be used with the present invention.

Another embodiment of the present invention does not require that a non-billable BDR is written. Because settlement occurs real-time with authorization, a BDR is not needed to process the customer billing. Therefore, an embodiment of the present invention does not include a non-billable BDR being written by either a manual operator console or validation gateway 130.

In an additional embodiment of the present invention, authorization requests are processed automatically by automated operator consoles rather than the SSCP 138. Automated operator consoles, also referred to as automated response units, are used to process many automated telecommunications services. The system and method of the present invention may be used with any caller interaction processor that can obtain information needed from the customer to process the call.

The system and method of the present invention may also be used with an X.25 COMM_PROCESS that does not fork out a child process or service in process. The X.25 COMM_PROCESS is a single point of interface between the VALID_PROCESS and the X.25 network. Any module that can perform the interface functions between VALID_PROCESS and the X.25 network or other packet switching network may be used.

While various embodiments of the present invention have been described above, it should be understood that they have been presented by way of example only, not limitation. Thus the breadth and scope of the present invention should not be limited by any of the above-described exemplary embodiments, but should be defined only in accordance with the following claims and their equivalents.

GLOSSARY

ACD: Automated Call Distributor
   The ACD provides switching functionality between the selected manual operator console and the interexchange network.
AIN: Advanced Intelligent Network Gateway
   The advanced intelligent network gateway is a computer system that provides message transfer and protocol conversion allowing communication between the manual operator consoles and the SDP.
BDR: Billing Data Record
   A record used in processing customer bills that is written by the caller interaction processor or the validation gateway. The BDR contains credit card information for billing purposes.
CLPROC: Client Process
   The CLPROC module of the VALID_APP computer program provides interface and timing for transferring messages between the validation gateway and the BDR server. The CLPROC module also packages the message for the recipient, either the validation gateway or the BDR server.
DEMUX_Demultiplex Process
   PROCESS: The DEMUX_PROCESS module of the VALID_APP computer program receives response packets for multiple credit card authorization transactions from the BDR server and sends the packets to the response queue associated with the particular authorization transaction.
LAN: Local Area Network
   The LAN assists in the distribution of calls among the manual operator consoles and provides information to the manual operator consoles to be used in the processing of calls.
ISNAP: Intelligent Service Network Applications Processor
   The ISNAP selects a manual operator console and ensures that incoming calls are distributed among the logically defined groups of manual operator consoles.
NBAPP: Non-Blocking Application
   The NBAPP module of the VALID_APP computer program transmits non-blocking calls between the validation gateway and the BDR server.
NIDS: Network Information Distribution Service
   NIDS is a network that distributes information such as a client-server network.
NSPP: Network Information Distribution Service (NIDS)
   Sequenced Packet Protocol NSPP is a session oriented, guaranteed delivery, packet exchange protocol. NSPP provides communications with client-server programs which use UDP/IP.

OSR: Operator Service Record

A record used in processing customer bills that is written by a switch and contains call time and another call related information.

SDP: Service Data Point

The SDP stores customer account information used for traffic handling, service provisioning, and billing of debit calls.

SSCP: Service Switching Control Point

Comprises switching and automated response unit capability. The service switching control point provides automated processing of debit calls by interacting directly with the caller who enters information in the telephone keypad.

TCAP: Transaction Capabilities Application Part

TCAP refers to a TCAP message that complies with the ANSI SS7 ISUP industry standard and is used to transfer information between the manual operator consoles and the SDP.

TCP/IP: Transmission Control Protocol/Internet Protocol.

TCP/IP is the protocol used by the SDP.

UDP/IP: User Datagram Protocol/Internet Protocol

A client server protocol used by the manual operator consoles.

UDP_RECV: User Datagram Protocol/Internet Protocol Receive Module

A module of the VALID_APP computer program that receives messages from caller interaction processors on client server networks using UDP/IP protocol.

UDP_SEND: User Datagram Protocol/Internet Protocol Send Module

A module of the VALID_APP computer program that sends messages to caller interaction processors on client server networks using UDP/IP protocol.

VALID_APP: Validation Application Computer Program

A computer program that processes validation requests from the caller interaction processors (either manual operator consoles or the SSCP). The validation application computer program converts the validation request message into a card request message that can be processed by a financial processor. The validation application computer program sends the card request message to the financial processor and receives a card reply message from the financial processor responding to the card request message. The validation application computer program then converts the card reply message to a validation response message and sends the response to the caller interaction processor. VALID_APP performs protocol conversion between UDP/IP and X.25.

VALID_Validation Process Module

PROCESS: VALID_PROCESS is a module of the VALID_APP computer program that builds card request messages using validation request messages received from a caller interaction processor. In addition, VALID_PROCESS builds validation response messages using card reply messages received from a financial processor. VALID_PROCESS provides the protocol conversion between UDP/IP and X.25

WAN: Wide Area Network

The WAN assists in the distribution of calls among the manual operator consoles and provides information to the manual operator consoles to be used in processing calls.

X.25 COMM_X.25 Communications Process Module

PROCESS: The primary module of the VALID_APP computer program for sending card request messages to the financial processor. X.25 COMM_PROCESS forks out a child process that accepts the card reply messages from the financial processor. The child X.25 COMM_PROCESS is terminated when the validation transaction is complete.

What is claimed is:

1. A method for billing a customer credit card account, comprising the steps of:
    (a) receiving by a validation gateway a validation request message containing transaction data from a caller interaction processor;
    (b) converting said validation request message from a client server protocol to a packet switching network protocol;
    (c) sending a card request message from said validation gateway to a financial processor for authorization to charge to said customer credit card account;
    (d) receiving by said validation gateway a card reply message from said financial processor;
    (e) converting from said packet switching network protocol to said client server protocol;
    (f) sending a validation response message from said validation gateway to said caller interaction processor;
    (g) writing by said validation gateway a billing data record; and
    (h) sending said billing data record from said validation gateway to a network information distribution service database server, including sending by a validation module of a validation computer program on said validation gateway a billing data record write request to a non-blocking application modules, sending by said non-blocking application module said billing data record write request to a client process module, sending by said client process module a billing data record write request to a billing data record service, sending by said billing data record service a billing data record write response to a demultiplex process module, sending by said demultiplex process module a billing data record write response to said client process, sending by said client process module a billing data record write response to said non-blocking application module, and sending by said non-blocking application module a billing data record write response to said validation module.

2. The method of claim 1, wherein step (a) comprises:
    obtaining by a caller interaction processor said validation request to bill said customer credit card account;
    collecting transaction data by an operator;
    entering said transaction data into said caller interaction processor;
    sending by said caller interaction processor said validation request message to bill to said customer credit card account; and
    receiving by said validation gateway a validation request message containing transaction data;
    wherein said caller interaction processor comprises a manual operator console.

3. The method of claim 1, wherein step (a) comprises:
    obtaining by a caller interaction processor said validation request to bill to said customer credit card account;
    collecting transaction data by said caller interaction processor;
    sending by said caller interaction processor said validation request message to bill to said customer credit card account; and
    receiving by said validation gateway a validation request message containing transaction data;
    wherein said caller interaction processor comprises a service switching control point or an automated response unit.

4. The method of claim 1, wherein step (a) comprises:

populating by said caller interaction processor one or more validation request fields in said validation request message with said transaction data obtained by said caller interaction processor from a customer or customer credit card; and sending by said caller interaction processor said validation request message to said validation gateway.

5. The method of claim 1, wherein step (a) comprises:

populating by said caller interaction processor a merchant identifier field in said validation request message with a merchant identifier associated with a service provider and a customer credit card account identifier obtained from a customer or a customer credit card;

populating by said caller interaction processor an authorization amount field in said validation request message with an authorization amount provided by said customer to be billed to said customer credit card account;

populating by said caller interaction processor one or more validation request fields in said validation request message with additional transaction data; and sending by said caller interaction processor said validation request message to said validation gateway;

wherein said validation request message is in a request information format.

6. The method of claim 1, wherein step (b) comprises:

receiving by said validation gateway from said caller interaction processor said validation request message;

retrieving transaction data from said validation request message;

storing said transaction data in a local message pending list; and building a card request message using said transaction data received in said validation request message.

7. The method of claim, 1 wherein step (b) comprises:

receiving by a client receive module of said validation computer program on said validation gateway from said caller interaction processor said validation request message;

sending said validation request message from said client receive module to a validation module of said one or more validation computer programs on said validation gateway;

retrieving transaction data from said validation request message by said validation module;

storing by said validation module said transaction data in a local message pending list;

building by said validation module said card request message from said transaction data in said validation request message; and sending said card request message from said validation module to a communications module of said validation computer program on said validation gateway.

8. The method of claim 1, wherein step (c) comprises:

sending said card request message from a communications module of a validation computer program on said validation gateway to said financial processor.

9. The method of claim 1, wherein step (d) comprises:

receiving by a communications module of a validation computer program on said validation gateway a card reply message from said financial processor.

10. The method of claim 1, wherein step (e) comprises:

receiving by said validation gateway from said financial processor said card reply message;

retrieving reply data from said card reply message;

mapping said reply data to an response code;

retrieving transaction data from a local message pending list; and building a validation response message using said transaction data from said local message pending list and said response code.

11. The method of claim 1, wherein step (e) comprises:

receiving by a communications module of a validation computer program on said validation gateway from said financial processor said card reply message;

sending said card reply message from said communications module to a validation module of said validation computer program on said validation gateway;

retrieving authorization data from said card reply message by said validation module;

mapping said authorization data from said card reply message;

retrieving transaction data from a local message pending list;

building by said validation module a validation response message using said transaction data in said local message pending list and said response code; and sending said validation response message from said validation module to a client send module of said validation computer program on said validation gateway.

* * * * *